United States Patent
Rofougaran

(10) Patent No.: US 8,195,928 B2
(45) Date of Patent: Jun. 5, 2012

(54) HANDHELD COMPUTING UNIT WITH MERGED MODE

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 681 days.

(21) Appl. No.: 12/393,490

(22) Filed: Feb. 26, 2009

(65) Prior Publication Data

US 2009/0198992 A1 Aug. 6, 2009

Related U.S. Application Data

(63) Continuation-in-part of application No. 12/026,681, filed on Feb. 6, 2008.

(51) Int. Cl.
*G06F 15/177* (2006.01)

(52) U.S. Cl. .................................. 713/2; 713/1; 713/100

(58) Field of Classification Search .................. 713/1, 2, 713/100
See application file for complete search history.

(56) References Cited

U.S. PATENT DOCUMENTS

| | | | |
|---|---|---|---|
| 4,807,183 A | 2/1989 | Kung | |
| 5,502,683 A | 3/1996 | Marchioro | |
| 5,745,733 A * | 4/1998 | Robinson | 710/71 |
| 5,754,948 A | 5/1998 | Metze | |
| 5,786,912 A | 7/1998 | Kartalopoulos | |
| 5,793,957 A * | 8/1998 | Kikinis et al. | 709/211 |
| 5,809,321 A | 9/1998 | Hansen | |
| 5,884,104 A | 3/1999 | Chase | |
| 5,964,847 A * | 10/1999 | Booth et al. | 710/1 |
| 6,182,203 B1 | 1/2001 | Simar | |
| 6,438,622 B1 | 8/2002 | Haghighi et al. | |
| 6,500,070 B1 | 12/2002 | Tomizawa et al. | |
| 6,584,533 B1 * | 6/2003 | Cho et al. | 710/303 |
| 6,663,295 B2 | 12/2003 | Kami et al. | |
| 6,735,663 B2 | 5/2004 | Watts, Jr. et al. | |
| 6,735,708 B2 | 5/2004 | Watts, Jr. | |
| 6,801,974 B1 | 10/2004 | Watts, Jr. et al. | |
| 6,816,925 B2 | 11/2004 | Watts, Jr. | |
| 6,961,237 B2 * | 11/2005 | Dickie | 361/679.04 |
| 7,065,326 B2 | 6/2006 | Lovberg | |
| 7,082,285 B2 | 7/2006 | Linde | |

(Continued)

FOREIGN PATENT DOCUMENTS

EP    1499070 A2    1/2005

(Continued)

OTHER PUBLICATIONS

Bruce K Gale, "RF, Electrical, and Magnetic Microsystems," date unknown, 8 pages.

(Continued)

*Primary Examiner* — Nitin Patel
(74) *Attorney, Agent, or Firm* — Garlick & Markison; Holly L. Rudnick

(57) ABSTRACT

A handheld computing unit includes a hardware section, an application section, and an operating system section. The hardware section and operating system section are operable to: detect another device; determine whether to merge functionality with the other device; and when it is determined to merge functionality with the other device, initiate a reboot of the handheld computing unit and of the other device in a merged mode, wherein, in the merged mode, the hardware section and a hardware section of the other device function as a single hardware section and the operating system section and an operating system section of the other device function as a single operating system section.

20 Claims, 15 Drawing Sheets

U.S. PATENT DOCUMENTS

| | | | |
|---|---|---|---|
| 7,149,837 B2 | 12/2006 | Watts, Jr. et al. | |
| 7,159,099 B2 | 1/2007 | Lucas | |
| 7,171,050 B2 | 1/2007 | Kim | |
| 7,197,584 B2 | 3/2007 | Huber et al. | |
| 7,218,143 B1 | 5/2007 | Young | |
| 7,257,093 B1 | 8/2007 | Witzke | |
| 7,330,702 B2 | 2/2008 | Chen et al. | |
| 7,406,062 B2 | 7/2008 | Hsu | |
| 7,444,393 B2 | 10/2008 | Chung | |
| 7,502,225 B2* | 3/2009 | Solomon et al. | 361/679.41 |
| 7,725,700 B2* | 5/2010 | Wang | 713/1 |
| 7,818,559 B2* | 10/2010 | Sadovsky et al. | 713/2 |
| 7,903,724 B2 | 3/2011 | Rofougaran | |
| 7,929,474 B2 | 4/2011 | Pettus | |
| 2002/0022521 A1 | 2/2002 | Idaka | |
| 2002/0049806 A1 | 4/2002 | Gatz et al. | |
| 2002/0061012 A1 | 5/2002 | Thi et al. | |
| 2002/0107010 A1 | 8/2002 | Witte | |
| 2002/0157001 A1* | 10/2002 | Huang et al. | 713/2 |
| 2002/0164945 A1 | 11/2002 | Olsen | |
| 2003/0001882 A1 | 1/2003 | Macer et al. | |
| 2003/0017845 A1 | 1/2003 | Doviak | |
| 2003/0040284 A1 | 2/2003 | Sato | |
| 2003/0059022 A1 | 3/2003 | Nebiker | |
| 2003/0078071 A1 | 4/2003 | Uchimyama | |
| 2003/0112585 A1 | 6/2003 | Silvester | |
| 2003/0126335 A1* | 7/2003 | Silvester | 710/303 |
| 2003/0128712 A1 | 7/2003 | Moriwaki | |
| 2003/0162503 A1 | 8/2003 | LeCren | |
| 2003/0172380 A1 | 9/2003 | Kikinis | |
| 2003/0221036 A1* | 11/2003 | Konetski | 710/303 |
| 2004/0054776 A1 | 3/2004 | Klotz | |
| 2004/0062308 A1 | 4/2004 | Kamosa | |
| 2004/0117442 A1 | 6/2004 | Thielen | |
| 2004/0123113 A1 | 6/2004 | Mathiassen et al. | |
| 2004/0153863 A1 | 8/2004 | Klotz | |
| 2004/0157559 A1 | 8/2004 | Sugikawa | |
| 2004/0174431 A1 | 9/2004 | Stienstra | |
| 2004/0203364 A1 | 10/2004 | Silvester | |
| 2004/0266336 A1 | 12/2004 | Patsiokas et al. | |
| 2005/0014468 A1 | 1/2005 | Salokannel | |
| 2005/0060598 A1 | 3/2005 | Klotz | |
| 2005/0124307 A1 | 6/2005 | Ammar et al. | |
| 2005/0185364 A1 | 8/2005 | Bell | |
| 2005/0250531 A1 | 11/2005 | Takebe et al. | |
| 2006/0026348 A1 | 2/2006 | Wallace | |
| 2006/0038731 A1 | 2/2006 | Turner | |
| 2006/0046762 A1 | 3/2006 | Yoon et al. | |
| 2006/0085675 A1 | 4/2006 | Popell | |
| 2006/0101164 A1 | 5/2006 | Lee | |
| 2006/0148568 A1 | 7/2006 | Schultz et al. | |
| 2006/0164271 A1 | 7/2006 | Hirt | |
| 2006/0167784 A1 | 7/2006 | Hoffberg | |
| 2006/0176851 A1 | 8/2006 | Bennett | |
| 2006/0190691 A1 | 8/2006 | Chauve | |
| 2006/0203758 A1 | 9/2006 | Tee et al. | |
| 2006/0252470 A1 | 11/2006 | Seshadri | |
| 2006/0260546 A1 | 11/2006 | Usami | |
| 2006/0262026 A1 | 11/2006 | Gainey et al. | |
| 2006/0269004 A1 | 11/2006 | Ibrahim | |
| 2006/0282635 A1 | 12/2006 | Mather | |
| 2007/0015558 A1 | 1/2007 | Zalewski et al. | |
| 2007/0038808 A1 | 2/2007 | Yim | |
| 2007/0147152 A1 | 6/2007 | Sekiguchi | |
| 2007/0155502 A1 | 7/2007 | Wu | |
| 2007/0167149 A1 | 7/2007 | Comstock | |
| 2007/0229270 A1 | 10/2007 | Rofougaran | |
| 2007/0239929 A1 | 10/2007 | Chen | |
| 2007/0268481 A1 | 11/2007 | Raskar et al. | |
| 2007/0298882 A1 | 12/2007 | Marks et al. | |
| 2008/0020843 A1 | 1/2008 | Wolinsky | |
| 2008/0028118 A1 | 1/2008 | Sayers et al. | |
| 2008/0040541 A1 | 2/2008 | Borckmann | |
| 2008/0063236 A1 | 3/2008 | Ikenoue et al. | |
| 2008/0070516 A1 | 3/2008 | Lee | |
| 2008/0076406 A1 | 3/2008 | Chen | |
| 2008/0151847 A1 | 6/2008 | Abujbara | |
| 2009/0006640 A1 | 1/2009 | Brouwer | |
| 2009/0198854 A1 | 8/2009 | Rofougaran | |
| 2009/0215533 A1 | 8/2009 | Zalewski et al. | |
| 2010/0146199 A1 | 6/2010 | Shaeffer | |

FOREIGN PATENT DOCUMENTS

WO     2009002464 A2     12/2008

OTHER PUBLICATIONS

Dr. Lynn Fuller, "Microelectromechanical Systems (MEMs) Applications—Microphones,"Rochester Institute of Technology Microelectronic Engineering, Apr. 25, 2005, pp. 1-43.

Radio Control Adapter; IBM Technical Disclosure Bulletin NN86081337; IBM; Aug. 1986.

Xilinx Inc.: Spartan-3AN FPGA Family Data Sheet, DS557, Jun. 2, 2008, p. 5.

Haworth, et al.; Public Security Screening for Metallic Objects with Millimetre-Wave Images; Heriot-Watt University; United Kingdom; pp. 1-4.

Elsadek, et al.; "A Compact 3-D Microwave Holographic Pointer System Using a Size Reduced Microstrip Planar Array"; Department of Electrical and Computer Engineering; University of California; pp. 1-5.

Elsadek, et al.; "Microstrip Multi-element Diversity Antenna Array for Three Dimensional Microwave Holographic Input Pointer (Holo3D)"; Department of Electrical and Computer Engineering; University of California; pp. 1-4.

E3 Wii Controller; Nintendo Wilmote; Technology Limitations; XGAMING, Inc.; pp. 1-5.

* cited by examiner

HANDHELD COMPUTING UNIT WITH MERGED MODE

The present U.S. Utility patent application claims priority pursuant to 35 U.S.C. §120, as a continuation in part (CIP), to the following U.S. Utility Patent Application which is hereby incorporated by reference in its entirety and made part of the present U.S. Utility Patent Application for all purposes:

1. U.S. patent application Ser. No. 12/026,681, entitled COMPUTING DEVICE WITH HANDHELD AND EXTENDED COMPUTING UNITS, filed Feb. 6, 2008, pending.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to communication systems and more particularly to computing devices used in such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless or wired networks. The wireless and/or wire lined communication devices may be personal computers, laptop computers, personal digital assistants (PDA), cellular telephones, personal digital video players, personal digital audio players, global positioning system (GPS) receivers, video game consoles, entertainment devices, etc.

Many of the communication devices include a similar basic architecture: that being a processing core, memory, and peripheral devices. In general, the memory stores operating instructions that the processing core uses to generate data, which may also be stored in the memory. The peripheral devices allow a user of the communication device to direct the processing core as to which operating instructions to execute, to enter data, etc. and to see the resulting data. For example, a personal computer includes a keyboard, a mouse, and a display, which a user uses to cause the processing core to execute one or more of a plurality of applications.

While the various communication devices have a similar basic architecture, they each have their own processing core, memory, and peripheral devices and provide distinctly different functions. For example, a cellular telephone is designed to provide wireless voice and/or data communications in accordance with one or more wireless communication standards (e.g., IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof). As another example, a personal digital audio player is designed to decompress a stored digital audio file and render the decompressed digital audio file audible.

Over the past few years, integration of the some of the communication device functions into a single device has occurred. For example, many cellular telephones now offer personal digital audio playback functions, PDA functions, and/or GPS receiver functions. Typically, to load one or more of these functions, files, or other applications onto a handheld communication device (e.g., a cellular telephone, a personal digital audio and/or video player, a PDA, a GPS receiver), the handheld communication device needs to be coupled to a personal computer or laptop computer. In this instance, the desired application, function, and/or file is first loaded on to the computer and then copied to the handheld communication device; resulting in two copies of the application, function, and/or file.

To facilitate such loading of the application, function, and/or file in this manner, the handheld communication device and the computer each require hardware and corresponding software to transfer the application, function, and/or file from the computer to the handheld communication device. As such, two copies of the corresponding software exist as well as having two hardware components (one for the handheld device and the second for the computer). In addition to the redundancy of software, timing issues, different versions of the software, incompatible hardware, and a plethora of other reasons cause the transfer of the application, function, and/or file to fail.

In addition to integration of some functions into a single handheld device, handheld digital audio players may be docked into a speaker system to provide audible signals via the speakers as opposed to a headphone. Similarly, a laptop computer may be docked to provide connection to a full size keyboard, a separate monitor, a printer, and a mouse. In each of these docking systems, the core architecture is not changed.

Due to the portable nature of the handheld devices and the increasing functionality of them, there may arise situations where it is desirable to connect with another device (e.g., another handheld device, a computer, an appliance, a television, a radio, a GPS receiver, etc.). Currently, a handheld device includes one or more wired or wireless interfaces to communication with other devices. In this regard, the devices have the same issue as describe above with a redundancy of software, timing issues, different versions of the software, incompatible hardware, and a plethora of other reasons cause the transfer of the application, function, and/or file to fail.

Therefore, a need exists for a computing device that includes a handheld computing unit and an extended computing unit, wherein the handheld computing unit may function in a merged mode.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
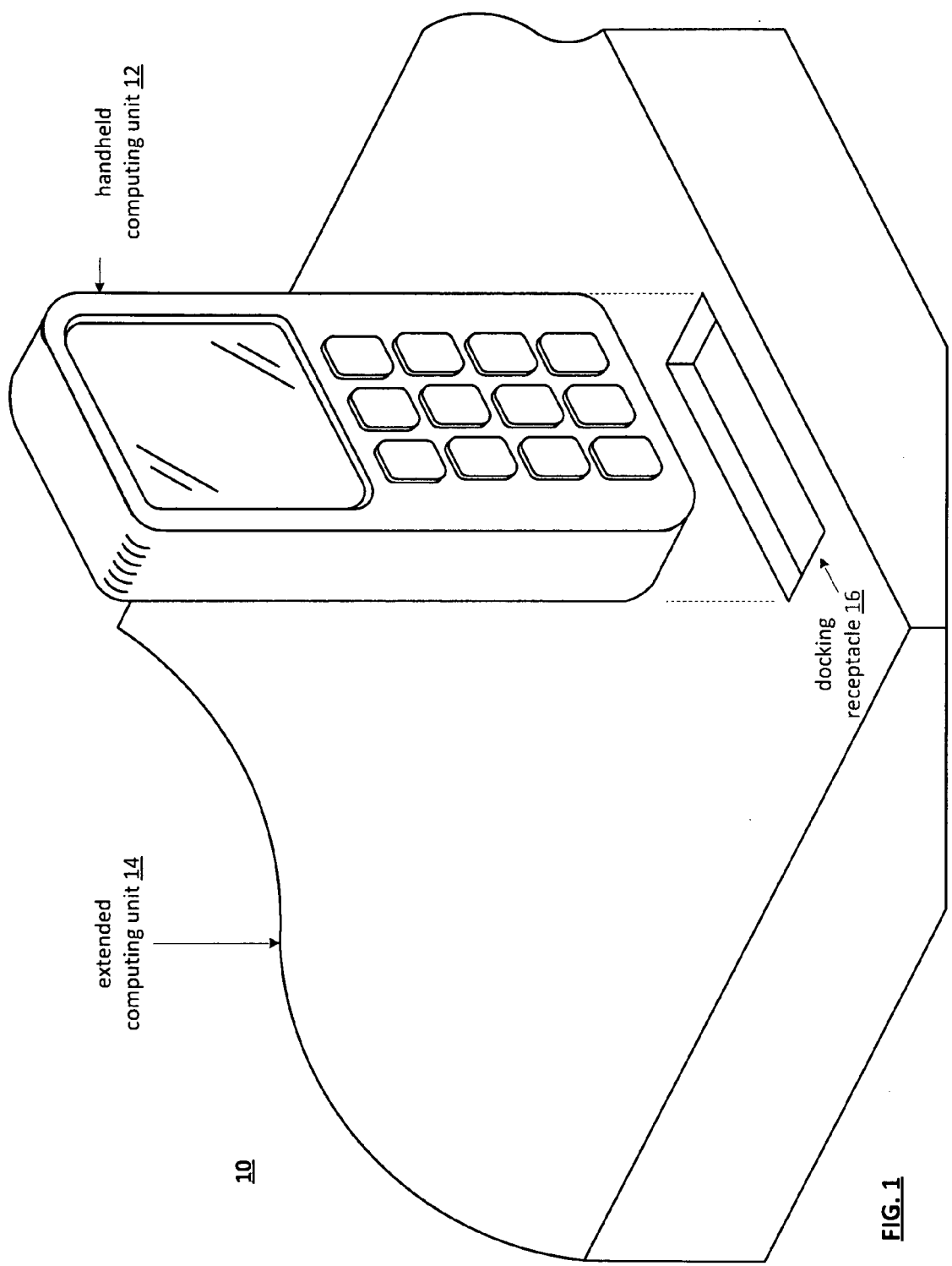
FIG. 1 is a diagram of an embodiment of a handheld computing unit and an extended computing unit in accordance with the present invention.

FIG. 1 is a diagram of an embodiment of a computing device 10 that includes a handheld computing unit 12 and an extended computing unit 14. The handheld computing unit 12 may have a form factor similar to a cellular telephone, personal digital assistant, personal digital audio/video player, etc. and includes a connector structure that couples to a docketing receptacle 16 of the extended computing unit 14.

In general, the handheld computing unit 12 includes the primary processing module (e.g., central processing unit), the primary main memory, and the primary hard disk memory for the computing device 10. In this manner, the handheld computing unit 12 functions as the core of a personal computer (PC) or laptop computer when it is docked to the extended computing unit and functions as a cellular telephone, a GPS receiver, a personal digital audio player, a personal digital video player, a personal digital assistant, and/or other handheld electronic device when it is not docked to the extended computing unit.

In addition, when the handheld computing unit 12 is docked to the extended computing unit 14, files and/or applications can be swapped therebetween. For example, assume that the user of the computing device 10 has created a presentation using presentation software and both reside in memory of the extended computing unit 14. The user may elect to transfer the presentation file and the presentation software to memory of the handheld computing unit 12. If the handheld computing unit 12 has sufficient memory to store the presentation file and application, then it is copied from the extended computing unit memory to the handheld computing unit memory. If there is not sufficient memory in the handheld computing unit, the user may transfer an application and/or file from the handheld computing unit memory to the extended computing unit memory to make room for the presentation file and application.

With the handheld computing unit 12 including the primary components for the computing device 10, there is only one copy of an application and/or of a file to support PC functionality, laptop functionality, and a plurality of handheld device functionality (e.g., TV, digital audio/video player, cell phone, PDA, GPS receiver, etc.). In addition, since only one copy of an application and/or of a file exists (other than desired backups), special software to transfer the applications and/or files from a PC to a handheld device is no longer needed. As such, the processing module, main memory, and I/O interfaces of the handheld computing unit 12 provide a single core architecture for a PC and/or a laptop, a cellular telephone, a PDA, a GPS receiver, a personal digital audio player, a personal digital video player, etc.

Figure 2:
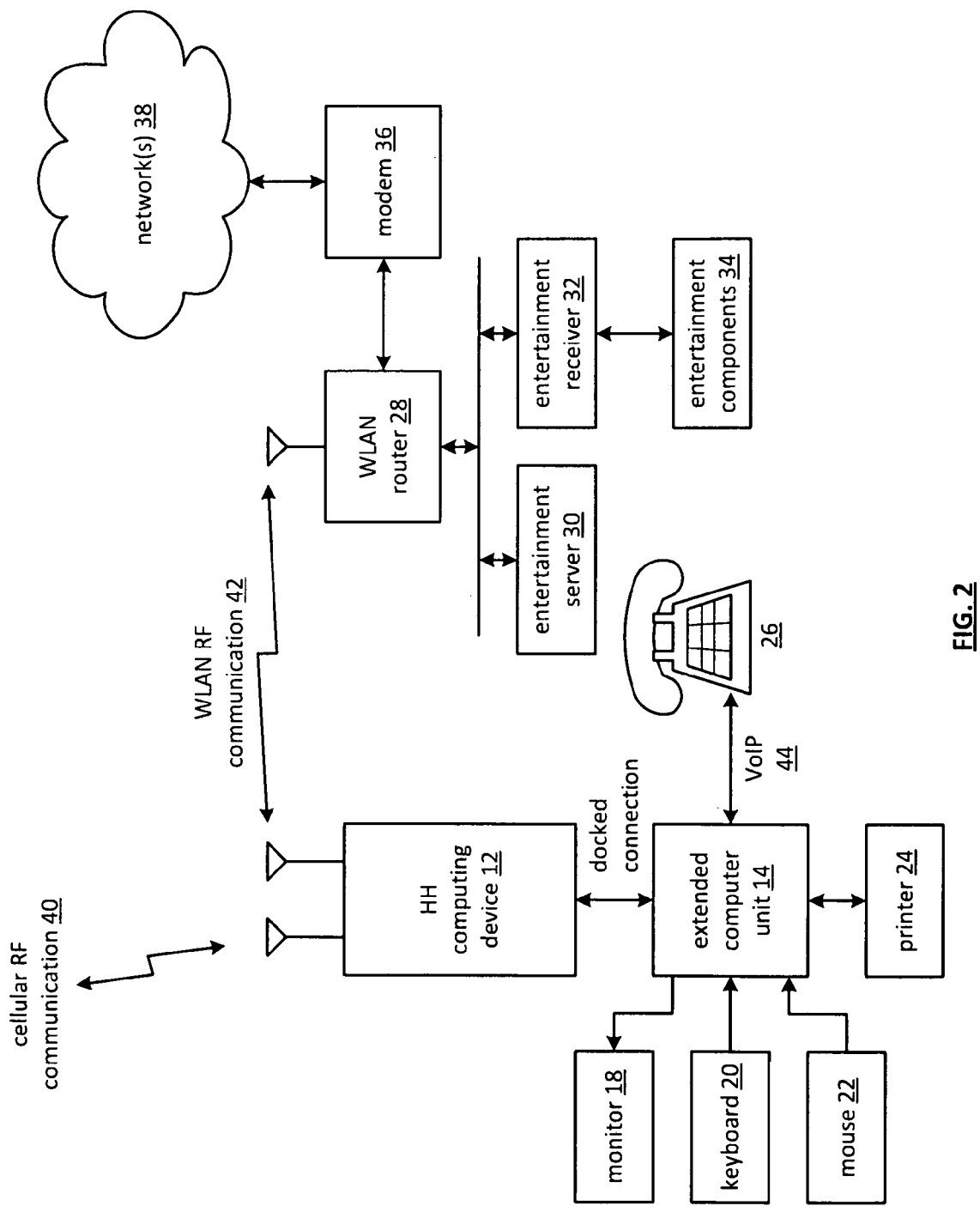
FIG. 2 is a schematic block diagram of an embodiment of a handheld computing unit docked to an extended computing unit in accordance with the present invention.

FIG. 2 is a schematic block diagram of an embodiment of a handheld computing unit 12 docked to an extended computing unit 14 within a communication system. In this embodiment, the communication system may include one or more of a wireless local area network (WLAN) router 28, a modem 36 coupled to the one or more networks 38 (e.g., a wireless local area network, a wide area network, the internet, the public switch telephone network, etc.), an entertainment server 30 (e.g., a server coupled to database of movies, music, video games, etc.), an entertainment receiver 32, entertainment components 34 (e.g., speaker system, television monitor and/or projector, DVD (digital video disc) player or newer versions thereof, VCR (video cassette recorder), satellite set top box, cable set top box, video game console, etc.), and a voice over internet protocol (VoIP) phone 26. As an alternative or in addition to the WLAN router 28, the system may include a local area network (LAN) router coupled to the extended computing unit 14.

As is also shown, the extended computing unit 14 is coupled to a monitor 18, a keyboard, a mouse 22, and a printer 24. The extended computing unit 14 may also be coupled to other devices (not shown) such as a trackball, touch screen, gaming devices (e.g., joystick, game pad, game controller, etc.), an image scanner, a webcam, a microphone, speakers, and/or a headset. In addition, the extended computing unit 14 may have a form factor similar to a personal computer and/or a laptop computer. For example, for in-home or in-office use, having the extended computing unit with a form factor similar to a PC may be desirable. As another example, for traveling users, it may be more desirable to have a laptop form factor.

In this example, the handheld computing unit 12 is docked to the extended computer unit 14 and function together to provide the computing device 10. The docking of the handheld computing unit 12 to the extended computing unit 14 encompasses one or more high speed connections between the units 12 and 14. Such a high speed connection may be provided by an electrical connector, by an RF connector, by an electromagnetic connector, and/or a combination thereof. In this mode, the handheld computing unit 12 and the extended computing 14 collectively function similarly to a personal computer and/or laptop computer with a WLAN card and a cellular telephone card.

In this mode, the handheld computing unit 12 may transceive cellular RF communications 40 (e.g., voice and/or data communications). Outgoing voice signals may originate at the VoIP phone 26 as part of a VoIP communication 44 or a microphone coupled to the extended computing unit 14. The outgoing voice signals are converted into digital signals that are subsequently converted to outbound RF signals. Inbound RF signals are converted into incoming digital audio signals and that may be provided to a sound card within the extended computing unit for presentation on speakers or provided to the VoIP phone via as part of a VoIP communication 44.

Outgoing data signals may originate at the mouse 22, keyboard 20, image scanner, etc. coupled to the extended computing unit 14. The outgoing data signals are converted into digital signals that are subsequently converted to outbound RF signals. Inbound RF signals are converted into incoming data signals and that may be provided to the monitor 18, the printer 24, and/or other character presentation device.

In addition, the handheld computing unit 12 may provide a WLAN transceiver for coupling to the WLAN router 28 to support WLAN RF communications 42 for the computing device 10. The WLAN communications 42 may be for accessing the internet 38 via modem 36, for accessing the entertainment server, and/or accessing the entertainment receiver 32. For example, the WLAN communications 42 may be used to support surfing the web, receiving emails, transmitting emails, accessing on-line accounts, accessing on-line games, accessing on-line user files (e.g., databases, backup files, etc.), downloading music files, downloading video files, downloading software, etc. As another example, the computing device 10 (i.e., the handheld computing unit 12 and the extended computing unit 14) may use the WLAN communications 42 to retrieve and/or store music and/or video files on the entertainment server; and/or to access one or more of the entertainment components 34 and/or the entertainment receiver 32.

Figure 3:
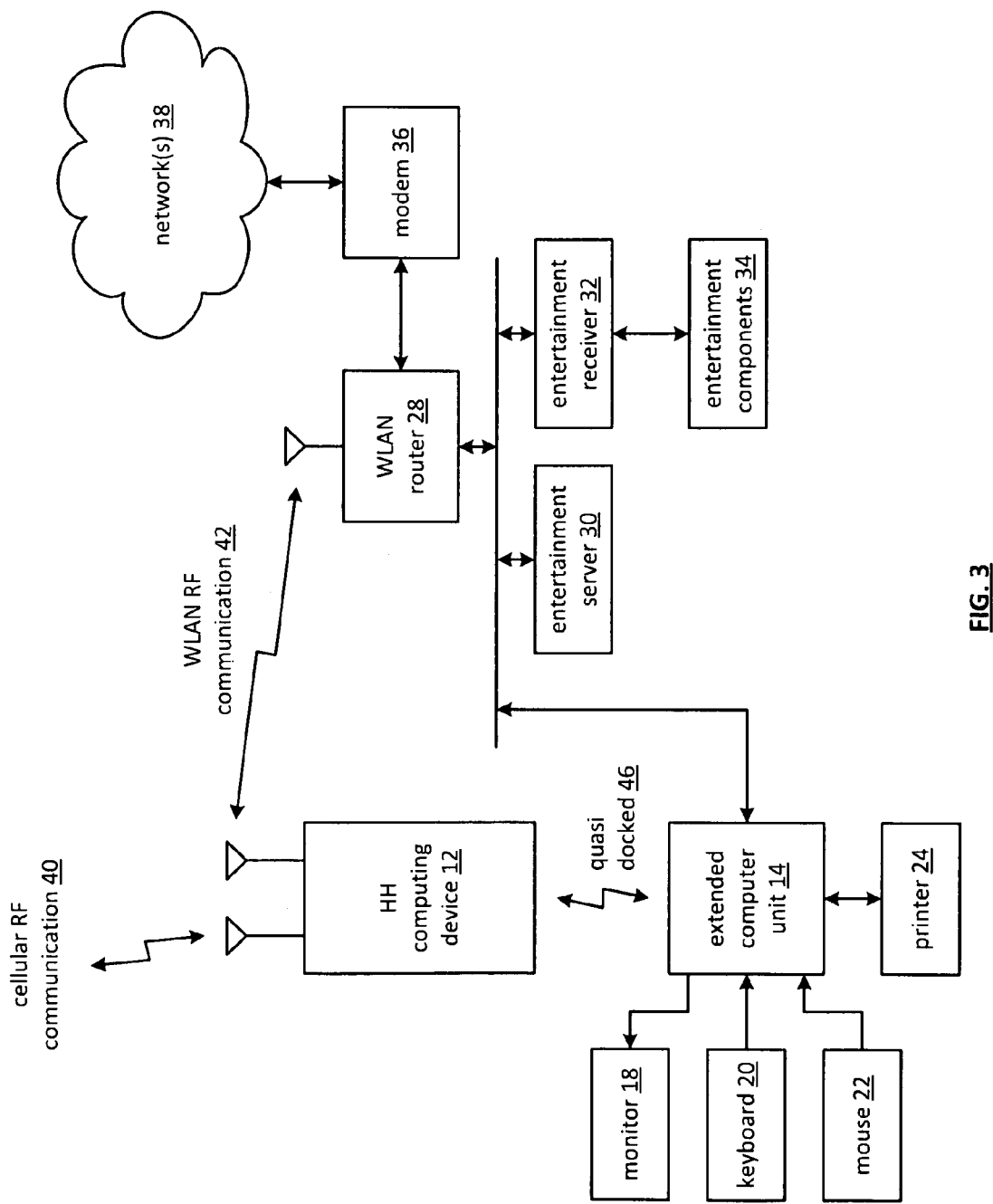
FIG. 3 is a schematic block diagram of an embodiment of a handheld computing unit quasi docked to an extended computing unit in accordance with the present invention.

FIG. 3 is a schematic block diagram of an embodiment of a handheld computing unit 12 quasi docked to an extended computing unit 14 within a communication system. In this embodiment, the communication system may include one or more of a wireless local area network (WLAN) router 28, a modem 36 coupled to the internet 38, an entertainment server 30 (e.g., a server coupled to database of movies, music, video games, etc.), an entertainment receiver 32, entertainment components 34 (e.g., speaker system, television monitor and/or projector, DVD (digital video disc) player or newer versions thereof, VCR (video cassette recorder), satellite set top box, cable set top box, video game console, etc.), and a voice over internet protocol (VoIP) phone 26. As an alternative or in addition to the WLAN router 28, the system may include a local area network (LAN) router coupled to the extended computing unit 14.

As is also shown, the extended computing unit 14 is coupled to a monitor 18, a keyboard, a mouse 22, and a printer 24. The extended computing unit 14 may also be coupled to other devices (not shown) such as a trackball, touch screen, gaming devices (e.g., joystick, game pad, game controller, etc.), an image scanner, a webcam, a microphone, speakers, and/or a headset. In addition, the extended computing unit 14 may have a form factor similar to a personal computer and/or a laptop computer.

In this example, the handheld computing unit 12 is quasi docked 46 to the extended computer unit 14, where the handheld computing unit 12 functions as a stand-alone computer with limited resources (e.g., processing modules, user inputs/outputs, main memory, etc. of the handheld computing unit) and limited access to the memory of the extended computing unit 14. The quasi docking 46 of the handheld computing unit 12 to the extended computing unit 14 is provided by an RF communication, where an RF transceiver of the handheld computing unit 12 is communicating with an RF transceiver of the extended computing unit 14. Depending on the bit rate of the RF connection, the handheld computing unit can access files and/or applications stored in memory of the extended computing unit 14. In addition, the handheld computing unit 12 may direct the processing module of the extended computing unit 14 to perform a remote co-processing function, but the processing module of the handheld computing unit and the extended computing unit do not function as a multi-processing module as they do when in the extended mode.

As an alternative, the quasi extended mode may be achieved by the handheld computing unit 12 communicating with the extended computing unit via the WLAN communication 42 and the WLAN router 28. As yet another example, the quasi extended mode may be achieved via a data cellular RF communication 40 via the network(s) 38 to the extended computing unit 14.

In this mode, the handheld computing unit 12 may transceive cellular RF communications 40 (e.g., voice and/or data communications). Outgoing voice signals originate at a microphone of the handheld computing unit 12. The outgoing voice signals are converted into digital signals that are subsequently converted to outbound RF signals. Inbound RF signals are converted into incoming digital audio signals and that are provided to a speaker, or headphone jack, of the handheld computing unit 12.

Outgoing data signals originate at a keypad or touch screen of the handheld computing unit 12. The outgoing data signals are converted into digital signals that are subsequently converted to outbound RF signals. Inbound RF signals are converted into incoming data signals that are provided to the handheld display and/or other handheld character presentation device.

In addition, the handheld computing unit 12 may provide a WLAN transceiver for coupling to the WLAN router 28 to support WLAN RF communications 42 with the WLAN router 28. The WLAN communications 42 may be for accessing the internet 38 via modem 36, for accessing the entertainment server 32, and/or accessing the entertainment receiver 32. For example, the WLAN communications 42 may be used to support surfing the web, receiving emails, transmitting emails, accessing on-line accounts, accessing on-line games, accessing on-line user files (e.g., databases, backup files, etc.), downloading music files, downloading video files, downloading software, etc. As another example, the handheld computing unit 12 may use the WLAN communications 42 to retrieve and/or store music and/or video files on the entertainment server; and/or to access one or more of the entertainment components 34 and/or the entertainment receiver 32.

Figure 4:
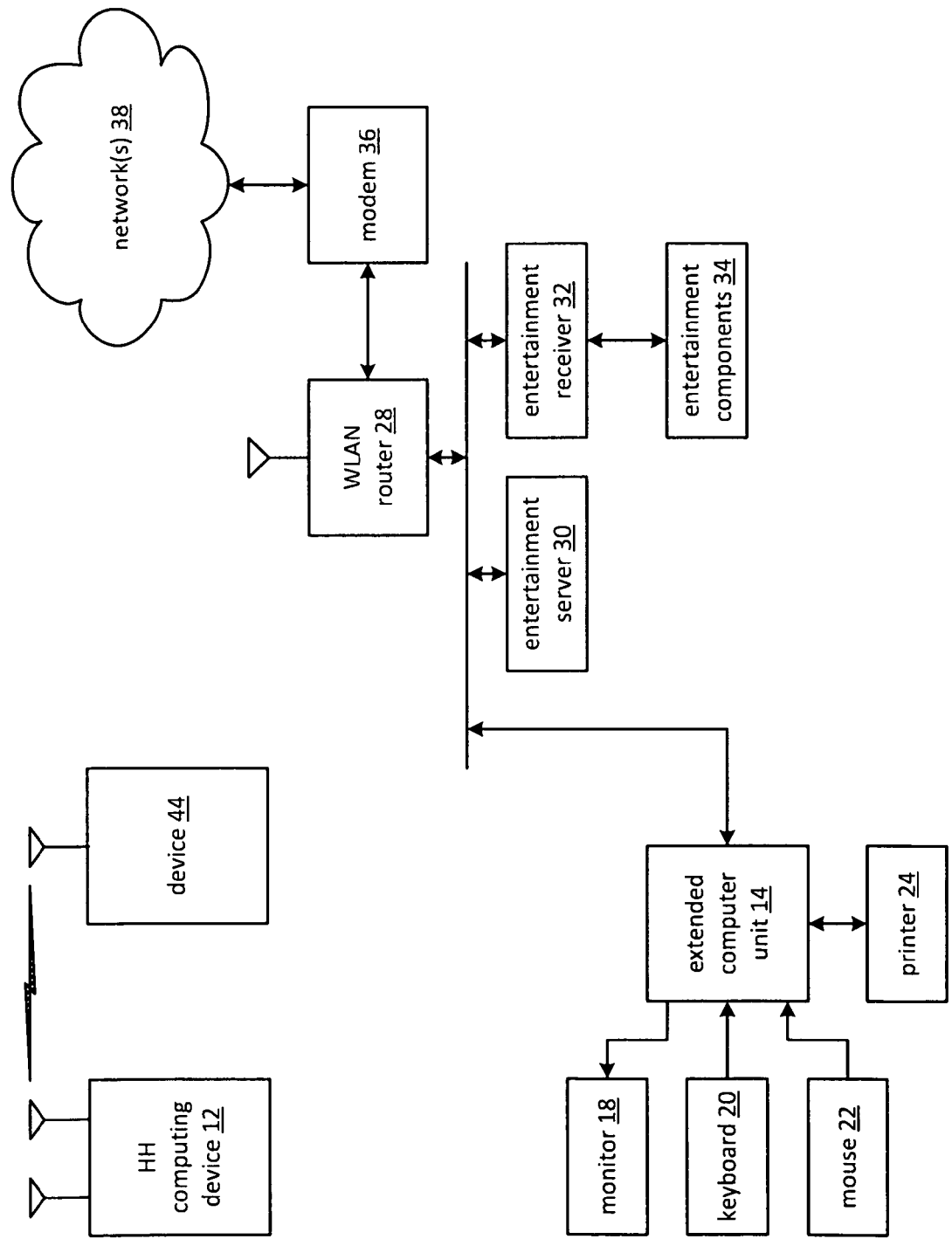
FIG. 4 is a schematic block diagram of an embodiment of a handheld computing unit in a merged mode with another device in accordance with the present invention.

FIG. 4 is a schematic block diagram of an embodiment of a handheld computing unit 12 in a merged mode with another device 44, which may be another handheld computing unit, a computer, a laptop, an appliance, a television set, a radio, a GPS receiver, and/or any electronic device that includes a core architecture as will be subsequently discussed with reference to FIG. 7. In this mode, the handheld computing unit is not connected to the extended computing unit 14.

In the merged mode, the hardware, operating system, and/or applications of the handheld computing unit 12 are at least partially merged with the hardware, operating system, and/or applications of the device 44. In this merged state, the unit 12 and the device 44 function as a single unit. In an embodiment, the hardware, operating system, and applications of the handheld computing unit 12 function as the primary components of the single merged unit (as will be discussed below with reference to FIG. 6-22).

With the handheld computing unit 12 including the primary components for the single unit, there is only one copy of an application and/or of a file to support inter-device communications, functionality, and/or handheld device functionality (e.g., TV, digital audio/video player, cell phone, PDA, GPS receiver, etc.). In addition, since only one copy of an application and/or of a file exists (other than desired backups), special software to transfer the applications and/or files between the handheld unit and the other device is no longer needed. As such, the processing module, main memory, and I/O interfaces of the handheld computing unit 12 provide a single core architecture for the merged unit.

As an example, assume that the handheld computing unit 12 detects the presence of a digital video recorder (DVR) and the user of the handheld computing unit 12 desires to download some video files and to change some DVR settings. The handheld computing unit 12 initiates communication with the DVR to determine whether it can enter into a merged mode. If so, the handheld computing unit 12 sends a request for the DVR to shutdown and enter a merged mode reboot state. The handheld computing unit 12 shutdowns and reboots in accordance with a merged mode operating system boot loader that points to a merged mode operating system within the handheld computing unit 12 and with the DVR. Both the handheld computing unit and the DVR re-boot based on the merged mode operating system to provide a single functional unit. In this mode, the DVR and the handheld computing unit 12 appear as a single unit to the user, thus transferring files and changing DVR settings is a simple and straightforward task.

Figure 5:
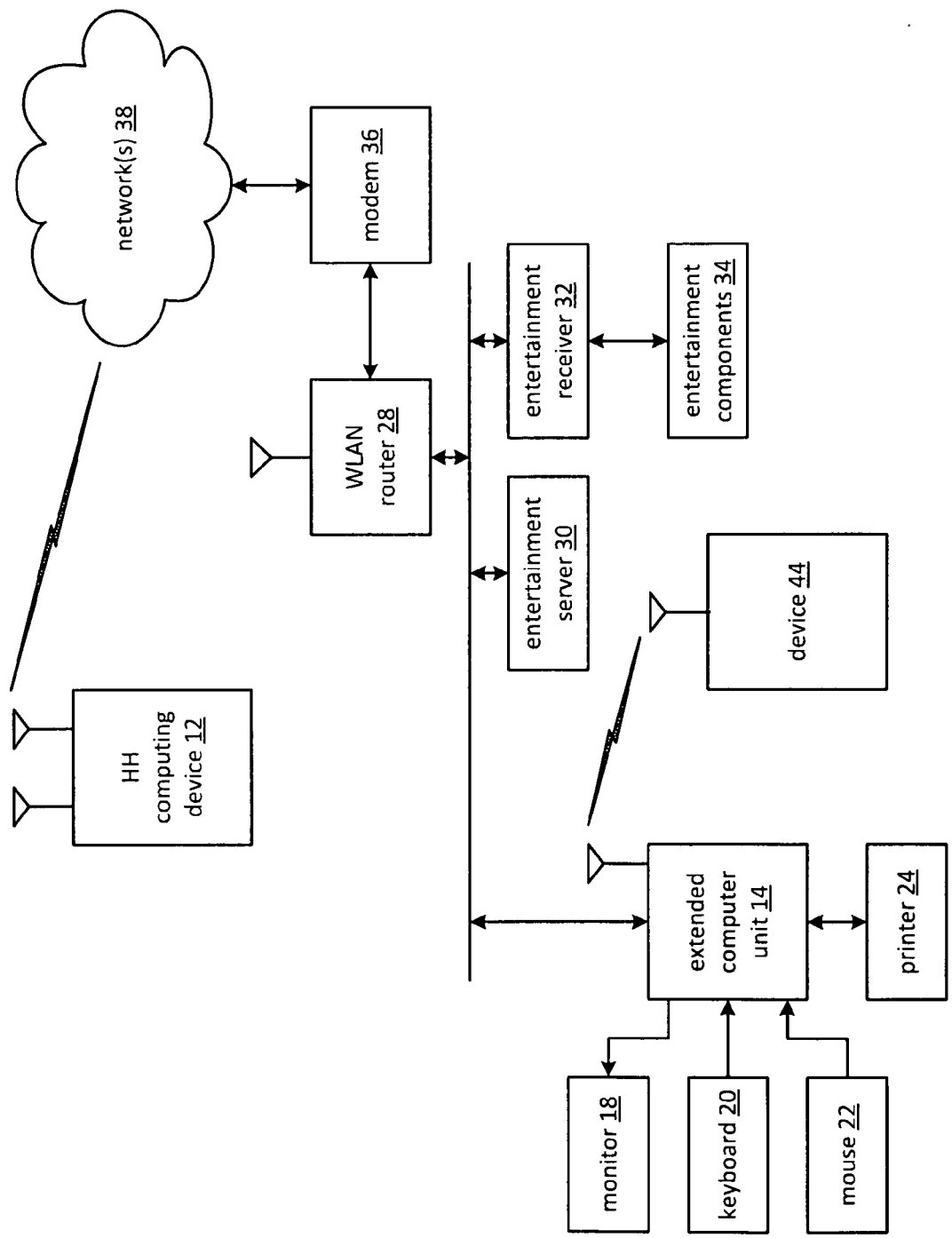
FIG. 5 is a schematic block diagram of another embodiment of a handheld computing unit in a merged mode with another device in accordance with the present invention.

FIG. 5 is a schematic block diagram of another embodiment of a handheld (HH) computing unit 12 in a merged mode with another device 44 via the extended (EXT) computing unit 14. In this mode, the hardware, operating system, and/or applications of the handheld computing unit 12 and of the extended computing unit 14 are at least partially merged with the hardware, operating system, and/or applications of the device 44. In this merged state, the HH unit 12, EXT unit 14, and the device 44 function as a single unit. In an embodiment, the hardware, operating system, and applications of the handheld computing unit 12 function as the primary components of the single merged unit (as will be discussed below with reference to FIG. 6-22).

With the handheld computing unit 12 including the primary components for the single unit, there is only one copy of an application and/or of a file to support inter-device communications, functionality, and/or handheld device functionality (e.g., TV, digital audio/video player, cell phone, PDA, GPS receiver, etc.). In addition, since only one copy of an application and/or of a file exists (other than desired backups), special software to transfer the applications and/or files between the handheld unit and the other device is no longer needed. As such, the processing module, main memory, and I/O interfaces of the handheld computing unit 12 provide a single core architecture for the merged unit.

Figure 6:
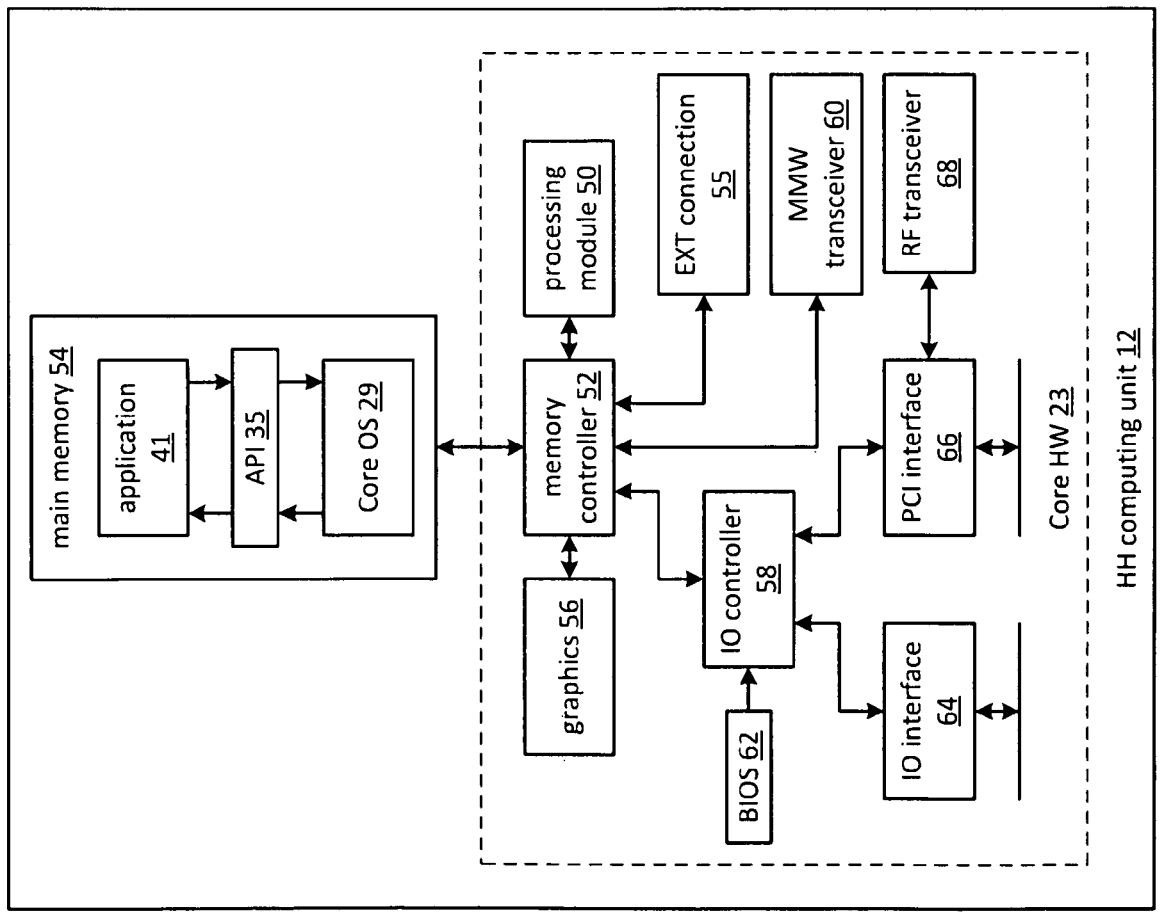
FIG. 6 is a schematic block diagram of an embodiment of a handheld computing unit in accordance with the present invention.

FIG. 6 is a schematic block diagram of an embodiment of a handheld (HH) computing unit 12 that includes a hardware (HW) section 23, an operating system (OS) section 29, an application programming interface (API) 35, and an applications section 41. The HW section 23 includes a processing module 50, a memory controller 52, an extended computing unit (EXT) connection module 55, a graphics card interface 56, an input/output (IO) controller 58, a millimeter wave (MMW) transceiver 60, a BIOS 62, an IO interface 64, a peripheral component interconnect (PCI) interface 66, and a radio frequency (RF) transceiver 68. Main memory 54 stores at least a portion of the OS 29, the API 35, and/or the application section 41.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-23.

For RF communications, the processing module converts outbound data (e.g., voice, text, audio, video, graphics, etc.) into outbound symbol stream in accordance with one or more wireless communication standards. Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

A transmitter section of the RF transceiver 65 converts the outbound symbol stream into an outbound RF signal that has a carrier frequency within a given frequency band (e.g., 900 MHz, 1800 MHz, 1900 MHz, 2.4 GHz, 5 GHz, etc.). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., $\pm\Delta\theta$ [phase shift] and/or $\theta(t)$ [phase modulation]) that adjusts the phase of the oscillation to produce a phase adjusted RF signal, which is transmitted as the outbound RF signal. In another embodiment, the outbound symbol stream includes amplitude information (e.g., A(t) [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., $\pm\Delta f$ [frequency shift] and/or f(t) [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., $\pm\Delta A$ [amplitude shift] and/or A(t) [amplitude modulation) that adjusts the amplitude of the oscillation to produce the outbound RF signal.

A receiver section of the RF transceiver 65 amplifies an inbound RF signal to produce an amplified inbound RF signal. The receiver section may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., $\pm\Delta\theta$ [phase shift] and/or $\theta(t)$ [phase modulation]) and/or frequency information (e.g., $\pm\Delta f$ [frequency shift] and/or f(t) [frequency modulation]). In another embodiment and/or in furtherance of the preceding embodiment, the inbound RF signal includes amplitude information (e.g., $\pm\Delta A$ [amplitude shift] and/or A(t) [amplitude modulation]). To recover the amplitude information, the receiver section includes an amplitude detector such as an envelope detector, a low pass filter, etc.

The processing module 50 converts the inbound symbol stream into inbound data (e.g., voice, text, audio, video, graphics, etc.) in accordance with one or more wireless communication standards. Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

For MMW communications, the processing module converts outbound data (e.g., voice, text, audio, video, graphics, etc.) into outbound symbol stream in accordance with one or more wireless communication standards. Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

A transmitter section of the MMW transceiver 85 converts the outbound symbol stream into an outbound RF signal that has a carrier frequency within a given frequency band (e.g., 29 GHz, 57-66 GHz, etc.). In an embodiment, this may be done by mixing the outbound symbol stream with a local oscillation to produce an up-converted signal. One or more power amplifiers and/or power amplifier drivers amplifies the up-converted signal, which may be MMW bandpass filtered, to produce the outbound MMW signal. In another embodiment, the transmitter section includes an oscillator that produces an oscillation. The outbound symbol stream provides phase information (e.g., $\pm\Delta\theta$ [phase shift] and/or $\theta(t)$ [phase modulation]) that adjusts the phase of the oscillation to produce a phase adjusted MMW signal, which is transmitted as the outbound MMW signal. In another embodiment, the outbound symbol stream includes amplitude information (e.g., A(t) [amplitude modulation]), which is used to adjust the amplitude of the phase adjusted MMW signal to produce the outbound MMW signal.

In yet another embodiment, the transmitter section includes an oscillator that produces an oscillation. The outbound symbol provides frequency information (e.g., $\pm\Delta f$ [frequency shift] and/or f(t) [frequency modulation]) that adjusts the frequency of the oscillation to produce a frequency adjusted MMW signal, which is transmitted as the outbound MMW signal. In another embodiment, the outbound symbol stream includes amplitude information, which is used to adjust the amplitude of the frequency adjusted MMW signal to produce the outbound MMW signal. In a further embodiment, the transmitter section includes an oscillator that produces an oscillation. The outbound symbol provides amplitude information (e.g., $\pm\Delta A$ [amplitude shift] and/or A(t) [amplitude modulation) that adjusts the amplitude of the oscillation to produce the outbound MMW signal.

A receiver section of the MMW transceiver 85 amplifies an inbound MMW signal to produce an amplified inbound RF signal. The receiver section may then mix in-phase (I) and quadrature (Q) components of the amplified inbound MMW signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., $\pm\Delta\theta$ [phase shift] and/or $\theta(t)$ [phase modulation]) and/or frequency information (e.g., $\pm\Delta f$ [frequency shift] and/or f(t) [frequency modulation]). In another embodiment and/or in furtherance of the preceding embodiment, the inbound MMW signal includes amplitude information (e.g., $\pm\Delta A$ [amplitude shift] and/or A(t) [amplitude modulation]). To recover the amplitude information, the receiver section includes an amplitude detector such as an envelope detector, a low pass filter, etc.

The processing module 50 converts the inbound symbol stream into inbound data (e.g., voice, text, audio, video, graphics, etc.) in accordance with one or more wireless communication standards. Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

Figure 7:
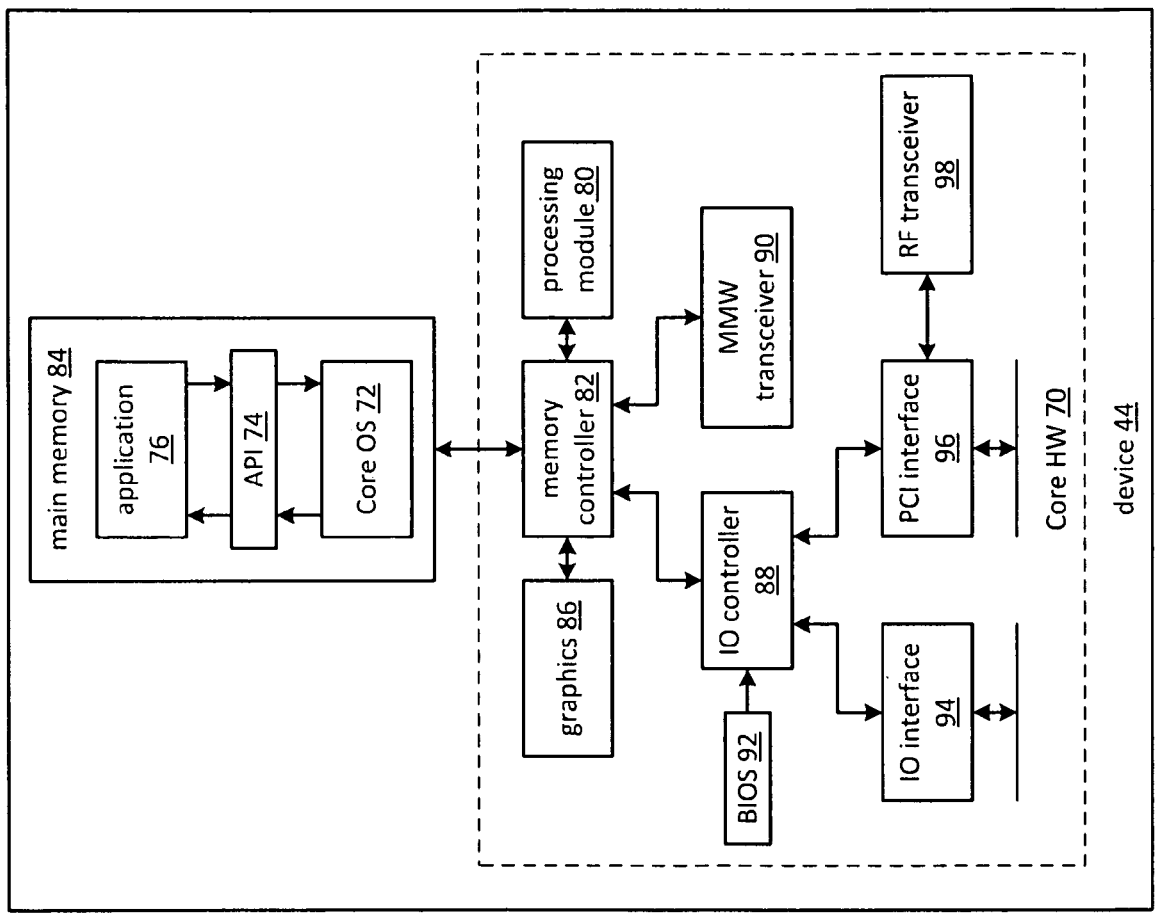
FIG. 7 is a schematic block diagram of an embodiment of a device in accordance with the present invention.

FIG. 7 is a schematic block diagram of an embodiment of a device 44 that includes a hardware (HW) section 70, an operating system (OS) section 72, an application programming interface (API) 74, and an applications section 76. The HW section 70 includes a processing module 80, a memory controller 82, a graphics card interface 86, an input/output (IO) controller 88, a millimeter wave (MMW) transceiver 90, a BIOS 92, an IO interface 94, a peripheral component interconnect (PCI) interface 96, and a radio frequency (RF) transceiver 98. Main memory 44 stores at least a portion of the OS 72, the API 74, and/or the application section 76. The RF transceiver 98 and the MMW transceiver 90 function similarly to the RF transceiver 68 and the MMW transceiver 60 of FIG. 6.

Figure 8:
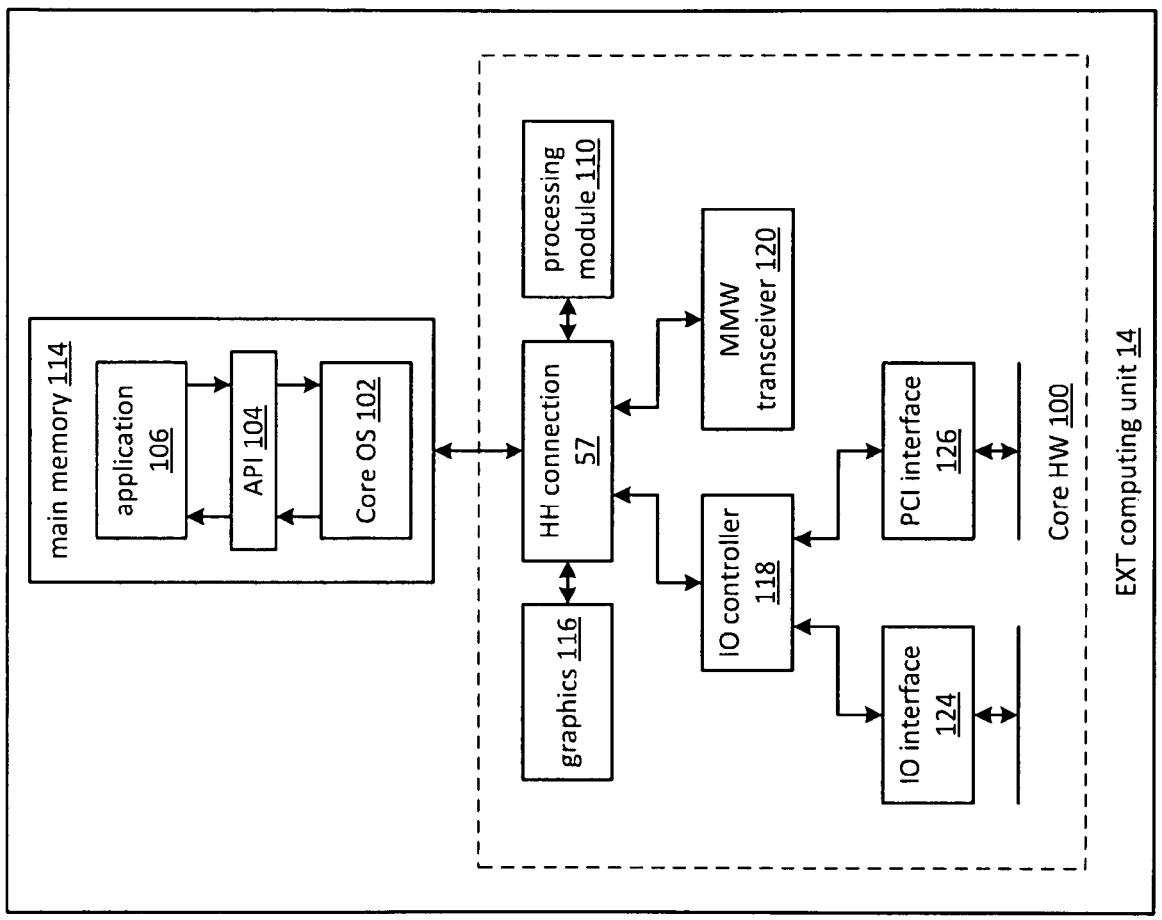
FIG. 8 is a schematic block diagram of an embodiment of an extended computing unit in accordance with the present invention.

FIG. 8 is a schematic block diagram of an embodiment of an extended computing unit 14 that includes a hardware (HW) section 100, an operating system (OS) section 102, an application programming interface (API) 104, and an applications section 106. The HW section 100 includes a processing module 110, an HH connection module 57 (which couples to the EXT connection module 55 of the HH unit to couple the EXT unit and HH unit together), a graphics card interface 116, an input/output (IO) controller 118, a millimeter wave (MMW) transceiver 120, an IO interface 124, and a peripheral component interconnect (PCI) interface 126. Main memory 104 stores at least a portion of the OS 102, the API 104, and/or the application section 106. The MMW transceiver 120 functions similarly to the MMW transceiver 60 of FIG. 6.

Figure 9:
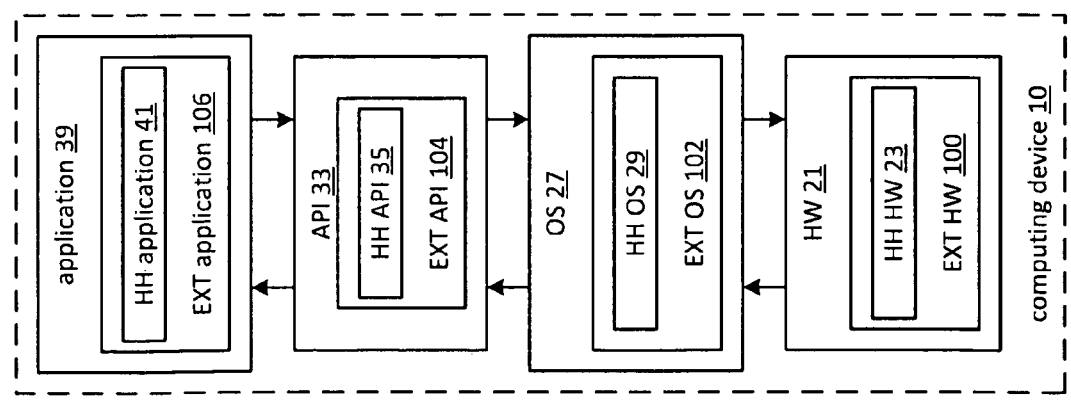
FIG. 9 is a schematic block diagram of an embodiment of a computing device that includes the handheld computing unit and the extended computing unit in accordance with the present invention.

FIG. 9 is a schematic block diagram of another embodiment of a computing device 10 that includes a handheld computing unit 12 docked, or quasi-docked, with an extended computing unit 14. In this diagram, the computing device 10 includes computer level applications 39, computer level application programming interfaces (API) 33, a computer level operating system 27, and computer level hardware 21. The computer level applications 39 include system applications (e.g., input/output device drivers, peripheral device drivers, printer spoolers, video graphics, etc.) and user applications (e.g., database programs, word processing programs, spreadsheet programs, audio playback programs, video playback programs, etc.).

The hardware 21 portion of the computing device 10 includes core hardware 23 on the handheld (HH) computing unit 12 and hardware 25 of the EXT computing unit 14. In this instance, the hardware of the HH computing unit 12 is the core hardware of the computing device 10 and the hardware of the EXT computing unit 14 provides an extension of the HH hardware 23. For example, the processing module of the HH computing unit 12 may use the processing module of the EXT computing unit 14 as a co-processor, as an auxiliary processor, as part of a multiple-processor core, or not use it at all. As another example, the HH computing unit 12 may use the main memory of the EXT computing unit 14 as an extension of its main memory, as an auxiliary main memory (e.g., use as a backup copy), as a second layer of cache (e.g., L1 or L2 cache), or not use it at all.

The operating system 27 includes a core operating system 29 stored in memory of the HH computing device 12 and an operating system extension 31 stored on the EXT computing unit 14. The operating system of the computing device 10 is discussed in detail with reference to FIGS. 20-36 of the parent application referenced above. In general, the core operating system 29 provides the primary operating system for the computing device 10 and the EXT operating system 31 augments the primary operating system for further functionality when the HH computing unit 12 is docked to the EXT computing unit 14.

The computer level API 33 includes APIs 35 that are stored on the HH computing unit 12 and APIs 37 that are stored on the EXT computing unit 14. Similarly, the computer level applications 39 include applications 41 that are stored on the HH computing unit 12 and applications 43 stored on the EXT computing unit 14. As described in the parent patent application, applications may reside on the handheld computing unit 12 (e.g., cellular telephone applications) or on the extended computing unit 14. The applications may be swapped therebetween such that, when the HH computing unit 12 is not docked to the EXT computing unit 14, the HH computing unit 12 can store the applications 39 of interest to the user of the HH computing device 12 in a mobile mode (i.e., not docked).

Figure 10:
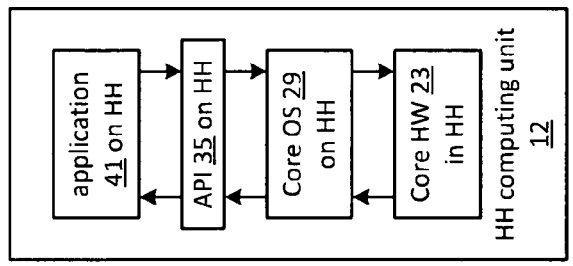
FIG. 10 is a schematic block diagram of another embodiment of a handheld computing unit in a remote mode with respect to an extended computing unit in accordance with the present invention.
Figure 10:
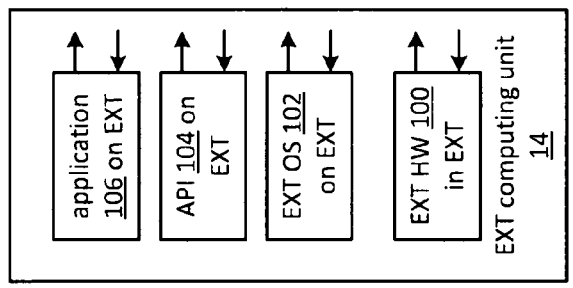

FIG. 10 is a schematic block diagram of another embodiment of a computing device 10 where the handheld computing unit 12 is not docked to an extended computing unit 14. In this instance, HH computing unit 12 functions as a stand-alone mobile device while the EXT computing unit 14 is substantially non-operational. As shown, the architecture of the HH computing unit 12 includes vertical functional coupling of the hardware 23, the operating system 29, the API 35, and the applications 41. As is also shown, the EXT computing unit 14 does not include vertical functional coupling since each of the blocks (e.g., hardware 25, operating system 31, API 37, and applications 43) are extensions of the corresponding blocks of the HH computing unit 12. In this manner, there is only one hardware core and one operating system for a computing device 10 that operates in an extended mode (e.g., FIG. 9) similarly to a personal computer and in a non-docked or mobile manner (e.g., FIG. 10) similarly to a cellular telephone with personal digital assistance capabilities, digital audio player capabilities, digital video player capabilities, handheld computing capabilities, and/or other mobile computing capabilities.

Figure 11:
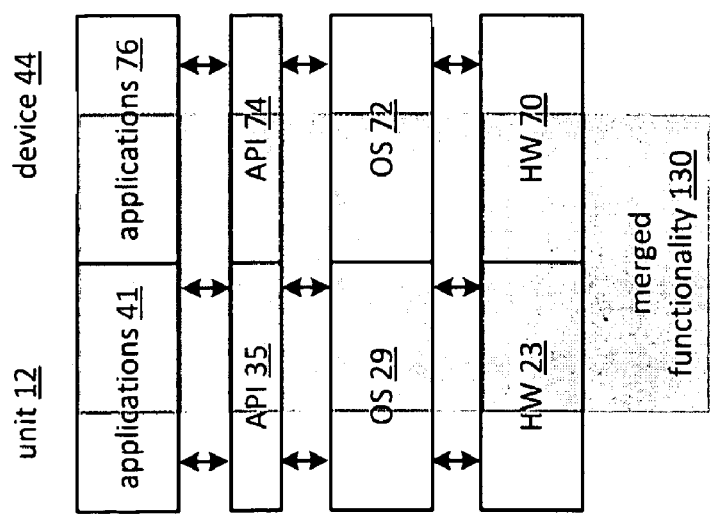
FIG. 11 is a diagram of an embodiment of a handheld computing unit and another device in a merged mode in accordance with the present invention.

FIG. 11 is a diagram of an embodiment of a handheld computing unit 12 and another device 44 in a merged mode. In this diagram, the merged units include merged level applications, merged level application programming interfaces (API), a merged level operating system, and merged level hardware. The merged level applications include system applications (e.g., input/output device drivers, peripheral device drivers, printer spoolers, video graphics, etc.) and user applications (e.g., database programs, word processing programs, spreadsheet programs, audio playback programs, video playback programs, etc.) of the HH unit 12 and/or of the device 44.

The merged level hardware section includes at least a portion of the core hardware 23 on the handheld (HH) computing unit 12 and at least a portion of the hardware 70 of the device 44. In this instance, the hardware of the HH computing unit 12 is the core hardware of the merged unit and the hardware of the device 44 provides an extension of the HH hardware 23. For example, the processing module of the HH computing unit 12 may use the processing module of the device 44 as a co-processor, as an auxiliary processor, as part of a multiple-processor core, or not use it at all. As another example, the HH computing unit 12 may use the main memory of the device 44 as an extension of its main memory, as an auxiliary main memory (e.g., use as a backup copy), as a second layer of cache (e.g., L1 or L2 cache), or not use it at all.

The merged level operating system includes a core operating system 29 stored in memory of the HH computing device 12 and an operating system extension 72 stored by the device 44. The merging of the operating system will be discussed in greater detail with reference to FIGS. 12-23. In general, however, the core operating system 29 provides the primary operating system for the computing device 10 and the device's operating system 72 augments the primary operating system.

The merged level API includes APIs 35 that are stored on the HH computing unit 12 and APIs 74 that are stored on the device 44. Similarly, the merged level applications include the applications 41 that are stored on the HH computing unit 12 and at least some of the applications 76 stored by the device 44. When in the merged mode, the merged level applications are available for execution by the merged unit.

Figure 12:
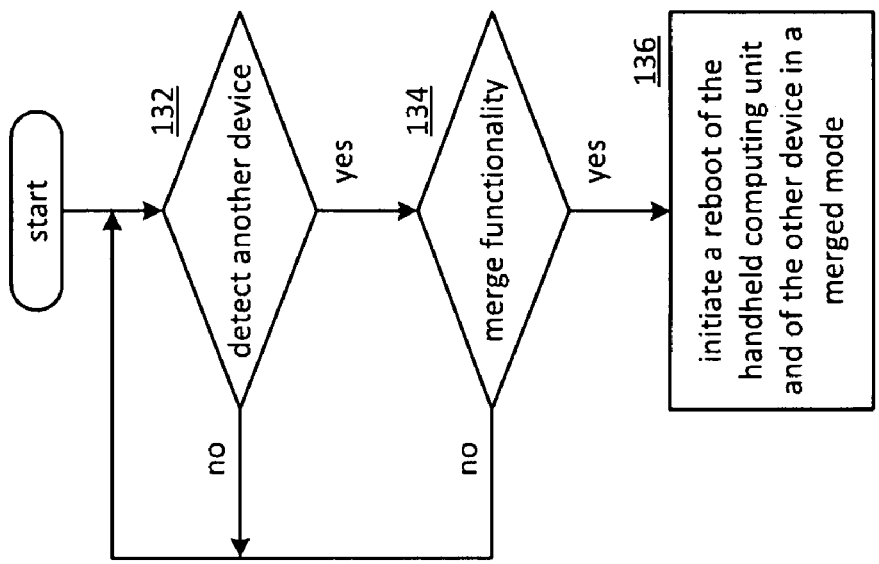
FIG. 12 is a logic diagram of an embodiment of a method for establishing a merged mode between a handheld computing unit and another device in accordance with the present invention.

FIG. 12 is a logic diagram of an embodiment of a method for establishing a merged mode between a handheld (HH) computing unit 12 and another device 44. The method begins at step 132 where the HH computing unit 12 detects that the other device 44 is within a communication range. This may be done via a wireless communication supported by the MMW transceivers.

If the device 44 is detected, the method continues at step 134 where the HH computing unit 12 determines whether to merge functionality with the other device 44. Various embodiments of such a determined are provided with reference to FIGS. 14 and 15. If the device 44 is not capable of merging with the HH computing unit, the method reverts back to step 132.

When the other device 44 is capable of merging, the method continues at step 136 where the HH computing unit 12 initiates a reboot of the handheld computing unit 12 and of the other device 44 into a merged mode. An embodiment of initiating the reboot will be provided with reference to FIG. 17.

Figure 13:
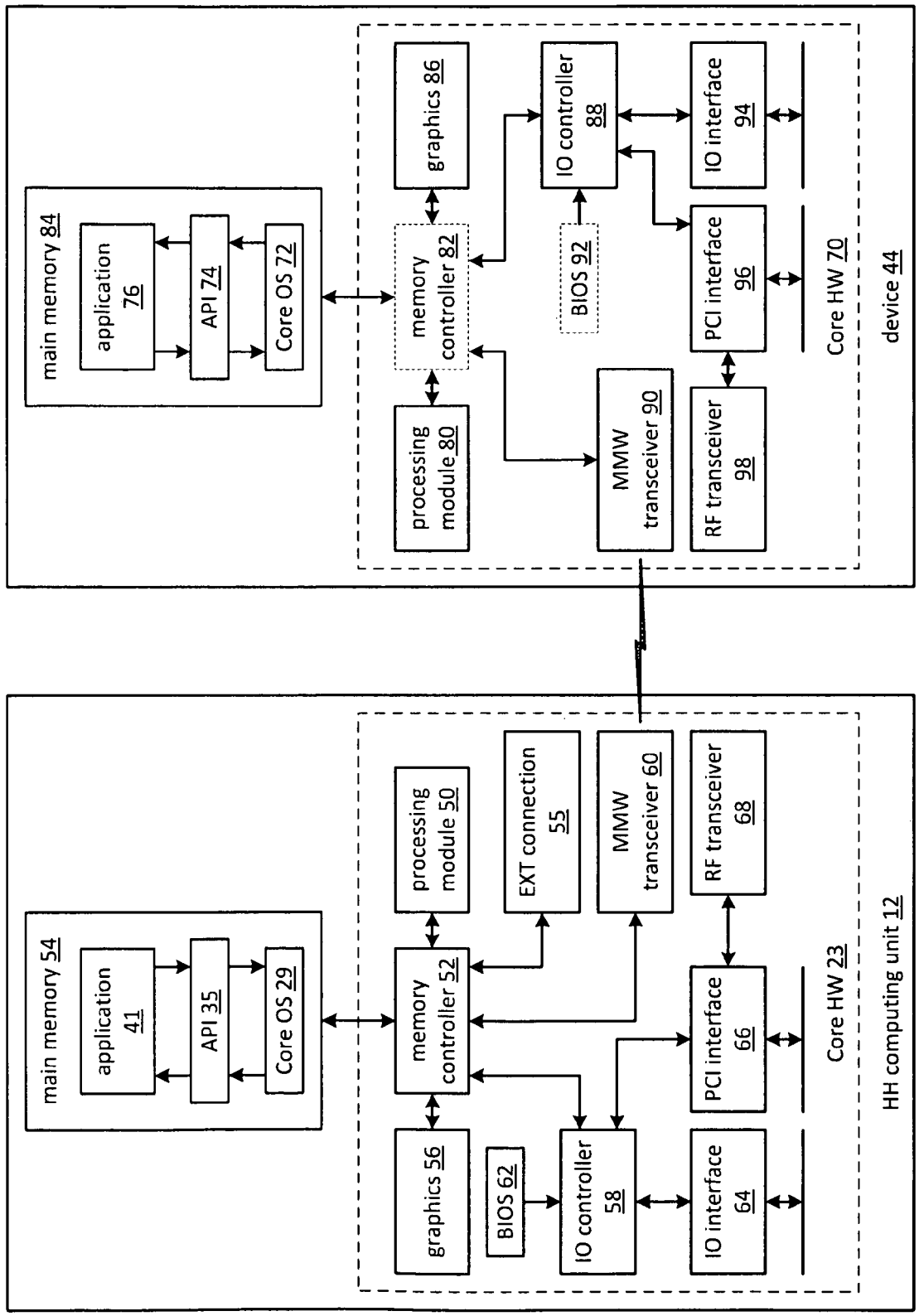
FIG. 13 is a schematic block diagram of an embodiment of a handheld computing unit and another device in a merged mode in accordance with the present invention.

FIG. 13 is a schematic block diagram of an embodiment of a handheld (HH) computing unit 12 and the other device 44 in a merged mode. As shown, the HH computing unit 12 and the other device 44 wirelessly communicate via the MMW transceivers 60 and 90 to support the merged mode. Further, the BIOS 92 is disabled and the memory controller 82 functions as a connection such that the memory controller 52 and/or the processing module 50 can access the processing module 80, the main memory 84 and/or other components of the device.

Figure 14:
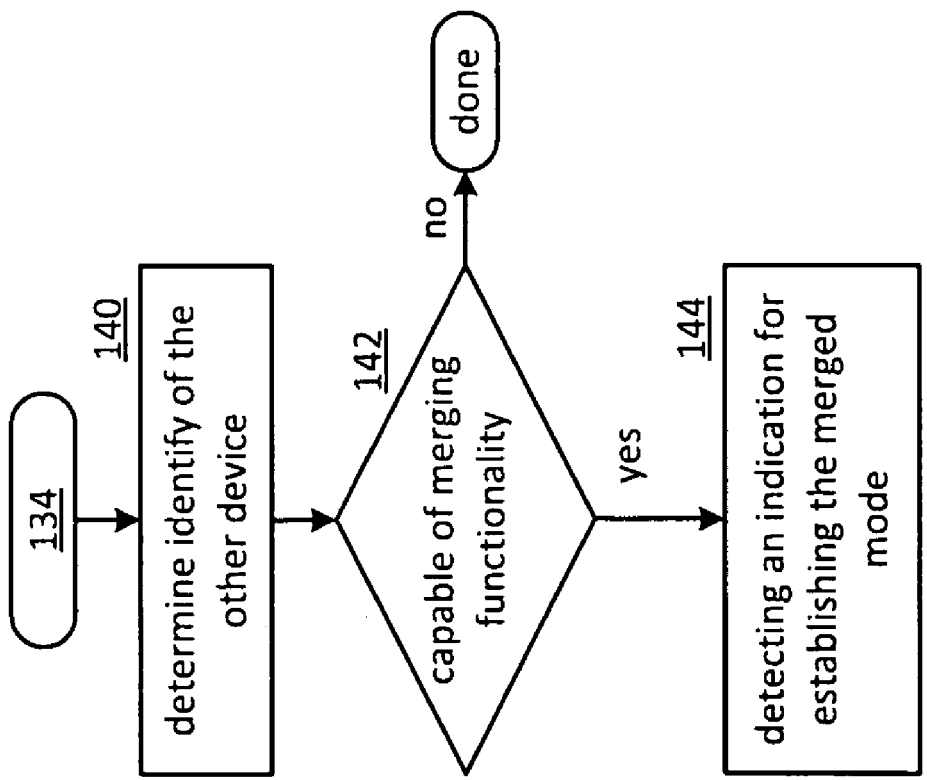
FIG. 14 is a logic diagram of an embodiment of a method for determining merge functionality in accordance with the present invention.

FIG. 14 is a logic diagram of an embodiment of a method for determining merge functionality of step 134 of FIG. 12. This method begins at step 140 where the handheld (HH) computing unit 12 determines the identity of the other device 44. This may be done via a handshaking operation where identification and capability information is exchanged between the unit and the device. Alternatively, the device may provide its identification (ID) code the HH computing unit, which uses the ID code to access a look up table to retrieve the device's capabilities.

The method continues at step 142 where the HH computing unit 12 determines whether the other device is capable of merging functionality with the handheld computing device. This is done based on obtaining the device's capabilities using the device's identity as discussed in the preceding paragraph. If the device is not capable, the process ends.

When the device is capable, the method continues at step 144 where the HH computing unit 12 detects an indication for establishing the merged mode. As an example, once it is determine that the device 44 is capable of merging, the HH computing unit 12 may send a request asking the device to merge. If a positive response is received, the indication is detected.

Figure 15:
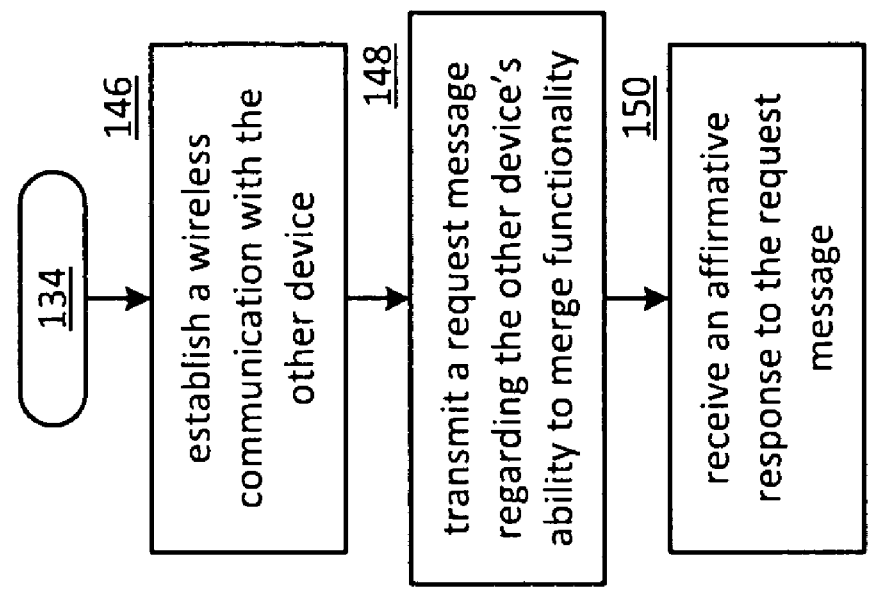
FIG. 15 is a logic diagram of another embodiment of a method for determining merge functionality in accordance with the present invention.

FIG. 15 is a logic diagram of another embodiment of a method for determining merge functionality of step 134 of FIG. 12. This method begins at step 146 where the handheld (HH) computing unit 12 establishes a wireless communication with the other device 44. This may be done via the RF transceivers or the MMW transceivers. The method continues at step 148 where the HH computing unit transmits, via the wireless communication, a request message regarding the other device's ability to merge functionality. The method continues at step 150 where the HH computing unit 12 receives, via the wireless communication, an affirmative response to the request message.

Figure 16:
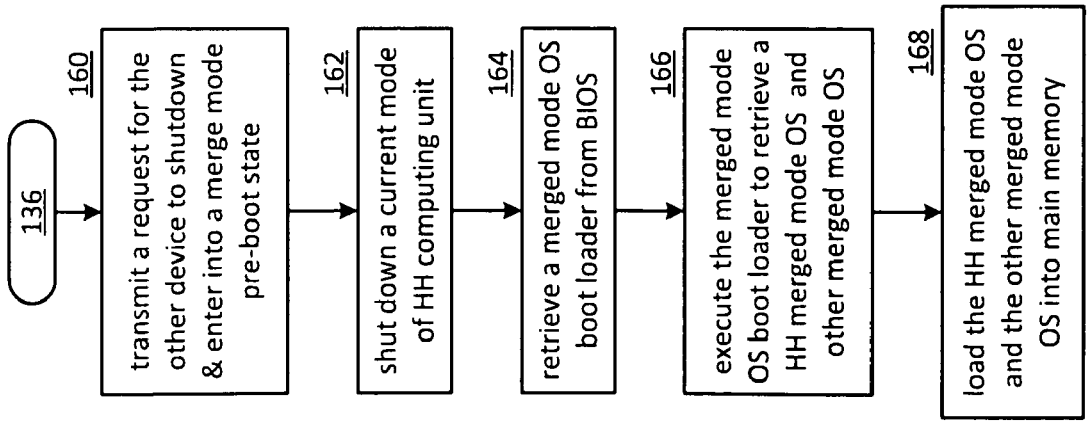
FIG. 16 is a logic diagram of an embodiment of a method for rebooting into a merged mode in accordance with the present invention.

FIG. 16 is a logic diagram of an embodiment of a method for rebooting into a merged mode of step 136 of FIG. 12. This method begins at step 160 where the handheld (HH) computing unit transmits a request to the other device 44, where the requests asks the other device 44 to shutdown a current mode of operation and enter into a merge mode pre-boot state. This may be done via the MMW transceivers. In the merged mode pre-boot state, the device will re-boot in a subordinate manner to the HH computing unit.

The method continues at step 162 where the HH computing unit 12 shuts down its current mode of operation. The method continues at step 164 where the HH computing retrieves a merged mode operating system boot loader from a basic input/output system (BIOS) memory of the hardware section. The boot loader may be a generic boot loader for entering the merged mode or it may be a specific boot loader for a specific device. For example, if the device is a DVR, the boot loader may be specific for a DVR.

The method continues at step 166 where the HH computing unit executes the merged mode operating system boot loader to retrieve a handheld merged mode operating system from the handheld computing unit and other merged mode operating system from the other device. The method continues at step 168, where the HH computing unit loads the handheld merged mode operating system and the other merged mode operating system into main memory of the hardware section to produce a merged mode operating system.

Figure 17:
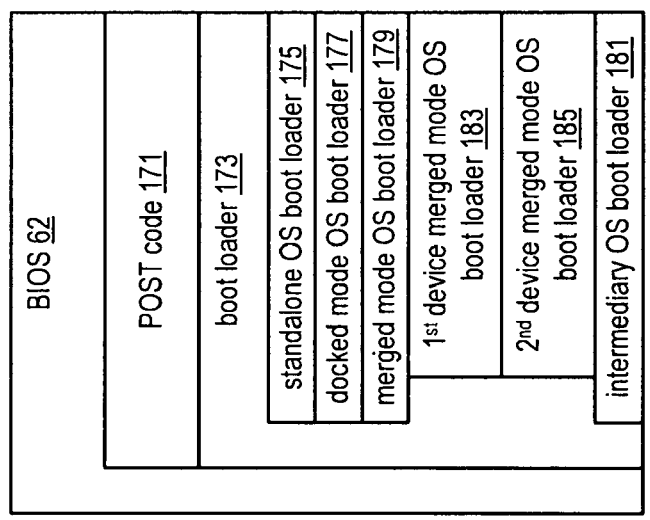
FIG. 17 is a schematic block diagram of an embodiment of a handheld computing unit's BIOS in accordance with the present invention.

FIG. 17 is a schematic block diagram of an embodiment of a handheld computing unit's BIOS 62 that includes a power on self test (POST) section 171 and a boot loader section 173. The boot loader section 173 includes a standalone operating system boot loader 175, a docked mode operating system boot loader 177, and a merged mode operating system boot loader 179. The boot loader section 173 may further include an intermediary operating system boot loader 181. In addition, the merged mode operating system may include individual device boot loaders. For example, the boot loader section 173 may further include a first device merged mode operating system boot loader 183 and a second device merged mode operating system boot loader 185.

Thus, when the HH computing unit 12 switches mode of operation, it retrieves the appropriate boot loader from the boot loader section 173. For example, when the HH computing unit 12 in changing to a merged mode, it retrieves the generic merged mode operating system boot loader 179 or one of the device specific boot loaders 183, 185. As another example, when the device is changing to a standalone mode, it retrieves the standalone operating system boot loader 175.

Figure 18:
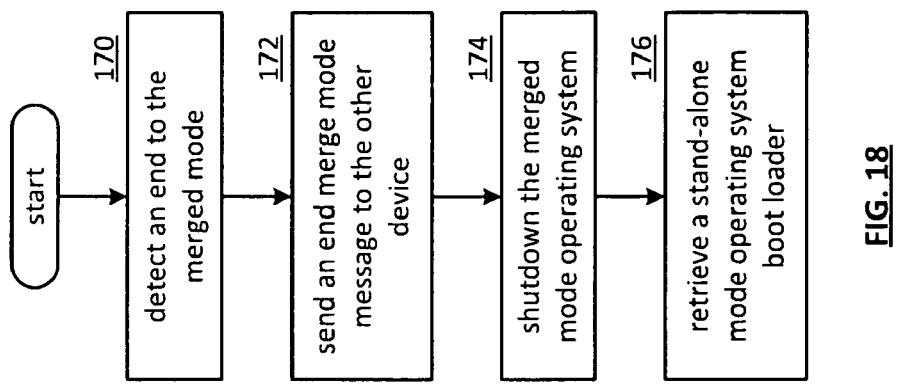
FIG. 18 is a logic diagram of an embodiment of a method for exiting from a merged mode in accordance with the present invention.

FIG. 18 is a logic diagram of an embodiment of a method for exiting from a merged mode. The method begins at step 170 where the HH computing unit detects an end to the merged mode. The end may be detected by the unit 12 and the device 44 becoming out of range for a MMW wireless communication. Alternatively, the unit may receive an indication of ending the merged mode from the user of the unit or from the device.

The method continues at step 172 where the HH computing unit sends an end merge mode message to the other device 44. This may be done via the MMW transceivers. If the end of the merge mode was detected by the MMW transceivers becoming out of range, the message is embedded into the communications, such that the device is not locked in a merged mode.

The method continues at step 174 where the HH computing unit shuts down the merged mode operating system. The method continues at step 176 where the HH computing unit retrieves a stand-alone mode operating system boot loader.

Figure 19:
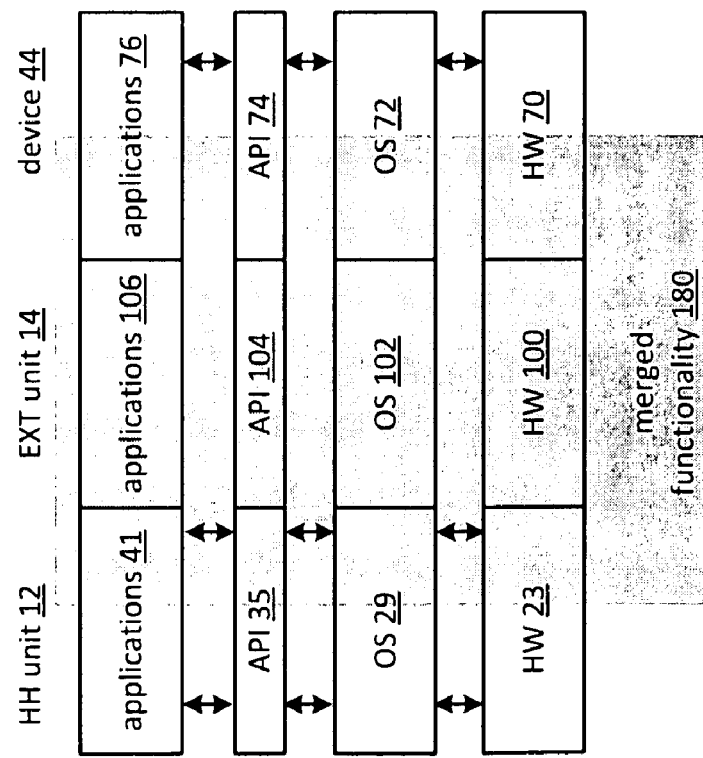
FIG. 19 is a diagram of another embodiment of a handheld computing unit and another device in a merged mode in accordance with the present invention.

FIG. 19 is a schematic block diagram of a handheld (HH) computing unit 12, the extended (EXT) computing unit 14 (as an intermediary device), and another device 44 in a merged mode. In this diagram, the merged units include merged level applications, merged level application programming interfaces (API), a merged level operating system, and merged level hardware. The merged level applications include system applications (e.g., input/output device drivers, peripheral device drivers, printer spoolers, video graphics, etc.) and user applications (e.g., database programs, word processing programs, spreadsheet programs, audio playback programs, video playback programs, etc.) of the HH unit 12, the EXT unit 14, and/or of the device 44.

The merged level hardware section includes at least a portion of the core hardware 23 on the handheld (HH) computing unit 12, the hardware 100 of the EXT unit 14, and at least a portion of the hardware 70 of the device 44. In this instance, the hardware of the HH computing unit 12 is the core hardware of the merged unit and the hardware of the EXT unit 14 and the device 44 provides an extension of the HH hardware 23. For example, the processing module of the HH computing unit 12 may use the processing module of the EXT unit 14 and/or of the device 44 as a co-processor, as an auxiliary processor, as part of a multiple-processor core, or not use it at all. As another example, the HH computing unit 12 may use the main memory of the EXT unit 14 and/or the device 44 as an extension of its main memory, as an auxiliary main memory (e.g., use as a backup copy), as a second layer of cache (e.g., L1 or L2 cache), or not use it at all.

The merged level operating system includes a core operating system 29 stored in memory of the HH computing device 12, the OS of the EXT unit 14, and an operating system extension 72 stored by the device 44. The merging of the operating system will be discussed in greater detail with reference to FIGS. 19-23. In general, however, the core operating system 29 provides the primary operating system for the computing device 10 and the device's operating system 72 and/or the EXT unit's operating system augments the primary operating system.

The merged level API includes APIs 35 that are stored on the HH computing unit 12, APIs 104 stored on the EXT unit 14, and APIs 74 that are stored on the device 44. Similarly, the merged level applications include the applications 41 that are stored on the HH computing unit 12, applications 106 stored by the EXT unit, and at least some of the applications 76 stored by the device 44. When in the merged mode, the merged level applications are available for execution by the merged unit 180.

Figure 20:
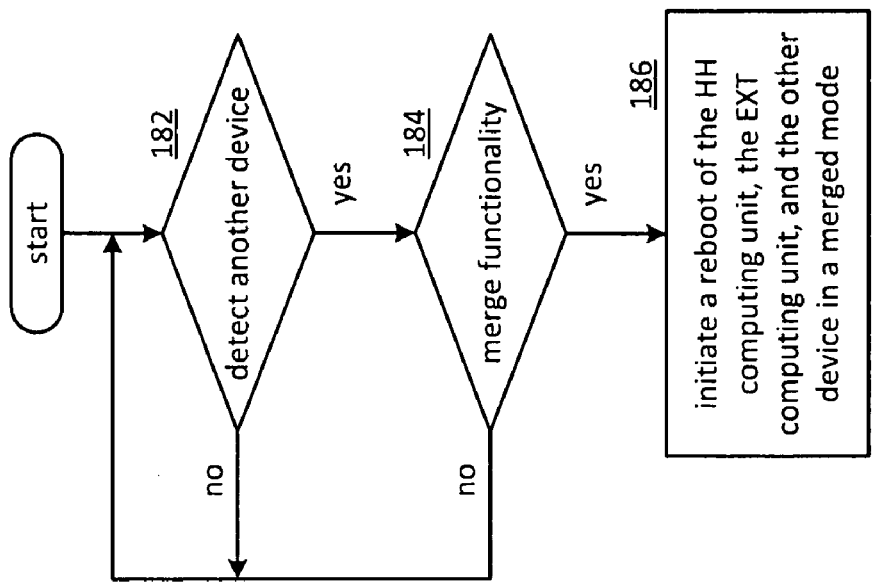
FIG. 20 is a logic diagram of another embodiment of a method for establishing a merged mode between a handheld computing unit and another device in accordance with the present invention.

FIG. 20 is a logic diagram of an embodiment of a method for establishing a merged mode between a handheld (HH) computing unit 12, the extended (EXT) computing unit 14, and the other device 44. The method begins at step 182 where the HH computing unit 12 detects that the other device 44 is within a communication range of the EXT unit 14. This may be done via a wireless communication supported by the MMW transceivers of the EXT unit and of the device 44. The HH unit 12 communicates the with the EXT unit 14 in a docked mode, a quasi-docked mode, or via the networks 38.

If the device 44 is detected, the method continues at step 184 where the HH computing unit 12 determines whether to merge functionality with the other device 44. Various embodiments of such a determined are provided with reference to FIGS. 21 and 22. If the device 44 is not capable of merging with the HH computing unit, the method reverts back to step 182.

When the other device 44 is capable of merging, the method continues at step 186 where the HH computing unit 12 initiates a reboot of the handheld computing unit 12, the EXT unit 14, and of the other device 44 into a merged mode. An embodiment of initiating the reboot will be provided with reference to FIG. 23. Note that, when the merge mode ends, the HH computing unit 12 may execute a method similar to that of FIG. 17.

Figure 21:
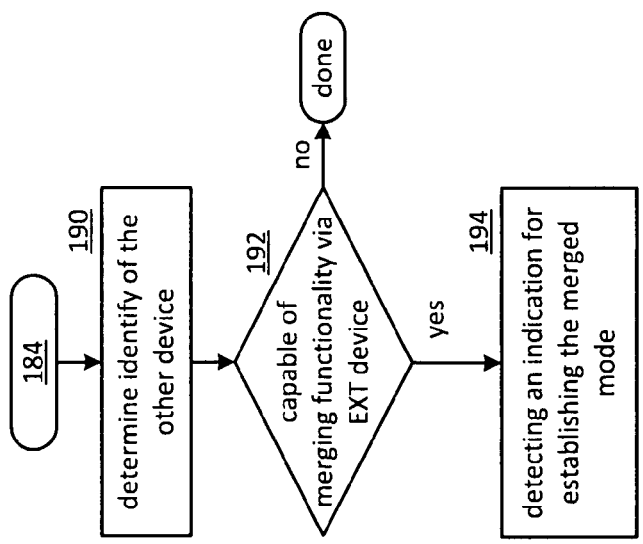
FIG. 21 is a logic diagram of another embodiment of a method for determining merge functionality in accordance with the present invention.

FIG. 21 is a logic diagram of an embodiment of a method for determining merge functionality of step 184 of FIG. 20. This method begins at step 190 where the handheld (HH) computing unit 12 determines the identity of the other device 44. This may be done via a handshaking operation through the EXT unit 14 where identification and capability information is exchanged between the unit and the device. Alternatively, the device may provide its identification (ID) code the HH computing unit via the EXT unit and the HH unit uses the ID code to access a look up table to retrieve the device's capabilities.

The method continues at step 192 where the HH computing unit 12 determines whether the other device is capable of merging functionality with the handheld computing device via the EXT unit 14. This is done based on obtaining the device's capabilities using the device's identity as discussed in the preceding paragraph. If the device is not capable, the process ends.

When the device is capable, the method continues at step 194 where the HH computing unit 12 detects an indication for establishing the merged mode. As an example, once it is determine that the device 44 is capable of merging via the EXT unit, the HH computing unit 12 may send a request via the EXT unit asking the device to merge. If a positive response is received, the indication is detected.

Figure 22:
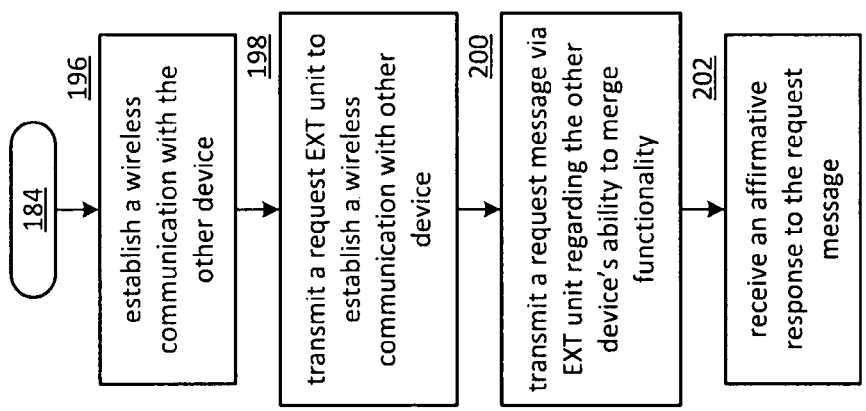
FIG. 22 is a logic diagram of another embodiment of a method for determining merge functionality in accordance with the present invention.

FIG. 22 is a logic diagram of another embodiment of a method for determining merge functionality of step 184 of FIG. 20. This method begins at step 196 where the handheld (HH) computing unit 12 establishes a wireless communication with the EXT unit. The method continues at step 198 where the HH unit requests that the EXT unit establish a wireless communication with the other device 44. This may be done via the RF transceivers or the MMW transceivers. The method continues at step 200 where the HH computing unit transmits, via the wireless communication, a request message regarding the other device's ability to merge functionality to the EXT unit 14. The method continues at step 202 where the HH computing unit 12 receives, via the wireless communication with the EXT unit, an affirmative response to the request message.

Figure 23:
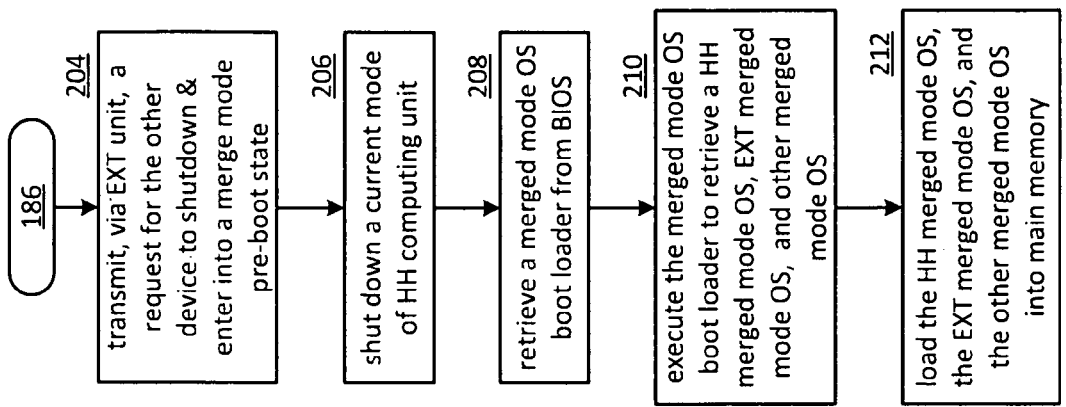
FIG. 23 is a logic diagram of another embodiment of a method for rebooting into a merged mode in accordance with the present invention.

FIG. 23 is a logic diagram of an embodiment of a method for rebooting into a merged mode of step 186 of FIG. 20. This method begins at step 204 where the handheld (HH) computing unit transmits, via the EXT unit 14, a request to the other device 44, where the requests asks the other device 44 to shutdown a current mode of operation and enter into a merge mode pre-boot state. This may be done via the MMW transceivers. In the merged mode pre-boot state, the device will re-boot in a subordinate manner to the HH computing unit.

The method continues at step 206 where the HH computing unit 12 shuts down its current mode of operation. The method continues at step 208 where the HH computing retrieves an intermediary merged mode operating system boot loader from a basic input/output system (BIOS) memory of the hardware section. The boot loader may be a generic boot loader for entering the merged mode or it may be a specific boot loader for a specific device. For example, if the device is a DVR, the boot loader may be specific for a DVR.

The method continues at step 210 where the HH computing unit executes the intermediary merged mode operating system boot loader to retrieve a handheld merged mode operating system from the handheld computing unit, an EXT operating system from the EXT unit, and other merged mode operating system from the other device. The method continues at step 212, where the HH computing unit loads the handheld merged mode operating system, the EXT operating system, and the other merged mode operating system into main memory of the hardware section to produce a merged mode operating system.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A handheld computing unit comprises:
   a hardware section;
   an application section; and
   an operating system section operably coupled to the hardware section and the application section, wherein the hardware section and operating system section:
   detect an additional device;
   determine whether to merge functionality with the additional device by:
     determining an identity of the additional device;
     determining whether, based on the identity, the additional device is capable of merging functionality with the handheld computing device; and
     when the additional device is capable of merging functionality with the handheld computing device, detecting an indication for establishing a merged mode; and
   when it is determined to merge functionality with the additional device, initiate a reboot of the handheld computing unit and of the additional device in the merged mode, wherein, in the merged mode, the hardware section and a hardware section of the additional device function as a single hardware section and the operating system section and an operating system section of the additional device function as a single operating system section.

2. The handheld computing unit of claim 1 further comprises the hardware section and operating system detecting the additional device by:
   establish a wireless communication with the additional device to determine information regarding the additional device.

3. The handheld computing unit of claim 1 further comprises the hardware section and operating system determining whether to merge functionality with the additional device by:
   establishing a wireless communication with the ether additional device;
   via the wireless communication, transmitting a request message regarding the additional device's ability to merge functionality; and
   via the wireless communication, receiving an affirmative response to the request message.

4. The handheld computing unit of claim 1 further comprises the hardware section and operating system rebooting the handheld computing unit and the additional device by:
   transmitting a request for the additional device to shutdown a current mode of operation and enter into a merge mode pre-boot state;
   shutting down a current mode of the handheld computing unit;
   retrieving a merged mode operating system boot loader from a basic input/output system (BIOS) memory of the hardware section;

executing the merged mode operating system boot loader to retrieve a handheld merged mode operating system from the handheld computing unit and other merged mode operating system from the additional device; and loading the handheld merged mode operating system and the other merged mode operating system into main memory of the hardware section to produce a merged mode operating system.

5. The handheld computing unit of claim 4 further comprises the hardware section and operating system retrieving the merged mode operating system boot loader by:

determining an identity of the additional device; and retrieving a specific merged mode operating system boot loader based on the identity of the additional device.

6. The handheld computing unit of claim 1 further comprises the hardware section and operating system:

detect an end to the merged mode;

send an end merge mode message to the additional device;

shutdown the merged mode operating system; and retrieve a stand-alone mode operating system boot loader.

7. The handheld computing unit of claim 1, wherein the hardware section comprises:

a processing module;

main memory;

a memory controller coupled to the main memory and the processing module;

a millimeter wave (MMW) transceiver coupled to the memory controller; and an input/output (IO) controller coupled to the memory controller.

8. The handheld computing unit of claim 1, wherein the hardware section further comprises:

a basic input/output system (BIOS) memory that includes at least a portion of the operating system section, the operating system section including:

a power on self test (POST) section; and a boot loader section that includes:

a standalone operating system boot loader;

a docked mode operating system boot loader; and a merged mode operating system boot loader.

9. A handheld computing unit comprises:

a hardware section;

an application section; and an operating system section operably coupled to the hardware section and the application section, wherein the hardware section and operating system section:

detect an additional device;

determine whether to merge functionality with the additional device via an intermediary device by:

determining an identity of the additional device;

determining whether, based on the identity, the additional device is capable of merging functionality with the handheld computing device via the intermediary device; and when the additional device is capable of merging functionality with the handheld computing device via the intermediary device, detecting an indication for establishing a merged mode; and when it is determined to merge functionality with the additional device via the intermediary device, initiate a reboot of the handheld computing unit, the intermediary device, and the additional device in the merged mode, wherein, in the merged mode, the hardware section and a hardware section of the additional device function as a single hardware section via the intermediary device and the operating system section and an operating system section of the additional device function as a single operating system section via the intermediary device.

10. The handheld computing unit of claim 9 further comprises the hardware section and operating system detecting the additional device by:

establish a communication link with the additional device via the intermediary device to determine information regarding the additional device.

11. The handheld computing unit of claim 9 further comprises the hardware section and operating system determining whether to merge functionality with the additional device via the intermediary device by:

establishing a wireless communication with the intermediary device;

transmitting a request message to the intermediary device that requests the intermediary device establish a communication with the additional device;

via the wireless communication, transmitting a request message regarding the additional device's ability to merge functionality to the intermediary device, wherein the request message further includes a request for the intermediary device to forward the message to the additional device; and via the wireless communication, receiving an affirmative response to the request message.

12. The handheld computing unit of claim 9 further comprises the hardware section and operating system rebooting the handheld computing unit and the additional device by:

transmitting a message to the intermediary device, wherein the message request that the additional device shutdown a current mode of operation and enter into a merge mode pre-boot state;

shutting down a current mode of handheld computing unit;

retrieving a merged mode operating system boot loader from a basic input/output system (BIOS) memory of the hardware section;

executing the merged mode operating system boot loader to retrieve a handheld merged mode operating system from the handheld computing unit, an intermediary merged mode operating system from the intermediary device, and other merged mode operating system from the additional device; and loading the handheld merged mode operating system, intermediary merged mode operating system, and the other merged mode operating system into main memory of the hardware section to produce a merged mode operating system.

13. The handheld computing unit of claim 12 further comprises the hardware section and operating system retrieving the merged mode operating system boot loader by:

determining an identity of the additional device; and retrieving a specific merged mode operating system boot loader based on the identity of the additional device.

14. The handheld computing unit of claim 9 further comprises the hardware section and operating system:

detect an end to the merged mode;

send an end merge mode message to the intermediary device;

shutdown the merged mode operating system; and retrieve a stand-alone mode operating system boot loader.

15. The handheld computing unit of claim 9, wherein the hardware section comprises:

a processing module;

main memory;

a memory controller coupled to the main memory and the processing module;

a millimeter wave (MMW) transceiver coupled to the memory controller; and an input/output (TO) controller coupled to the memory controller.

16. The handheld computing unit of claim 9, wherein the hardware section further comprises:

a basic input/output system (BIOS) memory that includes at least a portion of the operating system section, the operating system section including:

a power on self test (POST) section; and a boot loader section that includes:

a standalone operating system boot loader;

a docked mode operating system boot loader; and a merged mode operating system boot loader.

17. A handheld computing unit comprises:

a processing module;

main memory;

a memory controller operably coupled to the processing module and the main memory;

an input/output (TO) controller coupled to the memory controller; and a basic input/output system (BIOS) memory that includes:

a power on self test (POST) section; and a boot loader section that includes:

a standalone operating system boot loader for establishing a standalone mode in which the handheld computing unit operates as a stand-alone computing unit;

a docked mode operating system boot loader for establishing a docked mode with an additional device in which the handheld computing unit functions as a stand-alone computing unit with limited access to the additional device; and a merged mode operating system boot loader separate from the docked mode operating system boot loader, the merged mode operating system boot loader for establishing a merged mode with the additional device in which the processing module and a processing module of the additional device function as a single processing module.

18. The handheld computing unit of claim 17, wherein the boot loader section further comprises:

a first device merged mode operating system boot loader for establishing a first merged mode with a first additional device; and a second device merged mode operating system boot loader for establishing a second merged mode with a second additional device.

19. The handheld computing unit of claim 17, wherein the boot loader section further comprises:

an intermediary merged mode operating system boot loader.

20. The handheld computing unit of claim 17, wherein the processing module:

detects an additional device;

determines whether to merge functionality with the additional device by:

determining an identity of the additional device;

determining whether, based on the identity, the additional device is capable of merging functionality with the handheld computing device; and when the additional device is capable of merging functionality with the handheld computing device, detecting an indication for establishing a merged mode; and when it is determined to merge functionality with the additional device, initiate a reboot of the handheld computing unit and of the additional device in the merged mode by:

shutting down a current mode of handheld computing unit;

retrieving the merged mode operating system boot loader from the basic input/output system (BIOS) memory;

executing the merged mode operating system boot loader to retrieve a handheld merged mode operating system from the handheld computing unit and other merged mode operating system from the additional device; and loading the handheld merged mode operating system and the other merged mode operating system into main memory of the hardware section to produce a merged mode operating system.

* * * * *

UNITED STATES PATENT AND TRADEMARK OFFICE
CERTIFICATE OF CORRECTION

PATENT NO. : 8,195,928 B2  Page 1 of 1
APPLICATION NO. : 12/393490
DATED : June 12, 2012
INVENTOR(S) : Ahmadreza Rofougaran It is certified that error appears in the above-identified patent and that said Letters Patent is hereby corrected as shown below:

In the Claims
Col. 18, line 50, in claim 3: after "communication with the" delete "ether"
Col. 21, line 3, in claim 15: replace "(TO)" with --(IO)--
Col. 21, line 3, in claim 17: replace "(TO)" with --(IO)--

Signed and Sealed this
Third Day of December, 2013

Margaret A. Focarino
*Commissioner for Patents of the United States Patent and Trademark Office*